(12) United States Patent
Arimoto et al.

(10) Patent No.: US 11,956,398 B2
(45) Date of Patent: Apr. 9, 2024

(54) IMAGE READING DEVICE HAVING AN OVERLAP PREVENTER WITH SLIT PLATES

(71) Applicant: Mitsubishi Electric Corporation, Tokyo (JP)

(72) Inventors: Hironobu Arimoto, Tokyo (JP); Kazuya Makabe, Tokyo (JP); Daisuke Fukui, Tokyo (JP); Koki Takasaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/027,927

(22) PCT Filed: Jun. 1, 2021

(86) PCT No.: PCT/JP2021/020886
§ 371 (c)(1),
(2) Date: Mar. 23, 2023

(87) PCT Pub. No.: WO2022/064777
PCT Pub. Date: Mar. 31, 2022

(65) Prior Publication Data
US 2023/0412749 A1    Dec. 21, 2023

(30) Foreign Application Priority Data
Sep. 25, 2020    (JP) .................................. 2020-160321

(51) Int. Cl.
*H04N 1/031*    (2006.01)
*H04N 1/03*    (2006.01)
*H04N 1/191*    (2006.01)

(52) U.S. Cl.
CPC ......... *H04N 1/0312* (2013.01); *H04N 1/0306* (2013.01); *H04N 1/191* (2013.01); *H04N 2201/0081* (2013.01)

(58) Field of Classification Search
None
See application file for complete search history.

(56) References Cited

U.S. PATENT DOCUMENTS 4,432,022 A    2/1984    Tokumitsu
5,661,540 A    8/1997    Kaihotsu et al.
(Continued)

FOREIGN PATENT DOCUMENTS

JP    56-161772 A    12/1981
JP    6-342131 A    12/1994
(Continued)

OTHER PUBLICATIONS

International Search Report and Written Opinion dated Aug. 3, 2021, received for PCT Application PCT/JP2021/020886, filed on Jun. 1, 2021, 10 pages including English Translation.

*Primary Examiner* — Thomas D Lee
(74) *Attorney, Agent, or Firm* — XSENSUS LLP

(57) ABSTRACT

The present disclosure relates to an image reading device having a highly-accurate structure that enables an easy increase in depth of field, that is, improvement in the depth of the field, without need for a change in basic characteristics of lenses. An overlap preventer (5) disposed between a lens array (1) and a sensor element array (3) to prevent overlap of images formed by lenses (2) is included. A slit section (5) that is the overlap preventer (5) includes multiple slit plates (7) arranged in a main scanning direction and extending in a sub-scanning direction to partition off a space, and the slit plates (7) are fixed to fixing plates (13).

20 Claims, 27 Drawing Sheets

(56) References Cited

U.S. PATENT DOCUMENTS

| | | | |
|---|---|---|---|
| 2010/0128353 A1* | 5/2010 | Nagata | G02B 3/0062 359/619 |
| 2011/0038038 A1* | 2/2011 | Kamm | H04N 1/03 359/362 |
| 2015/0053844 A1 | 2/2015 | Kitamura et al. | |

FOREIGN PATENT DOCUMENTS

| | | |
|---|---|---|
| JP | 2000-35519 A | 2/2000 |
| JP | 2009-180976 A | 8/2009 |
| WO | 2013/146873 A1 | 10/2013 |

* cited by examiner

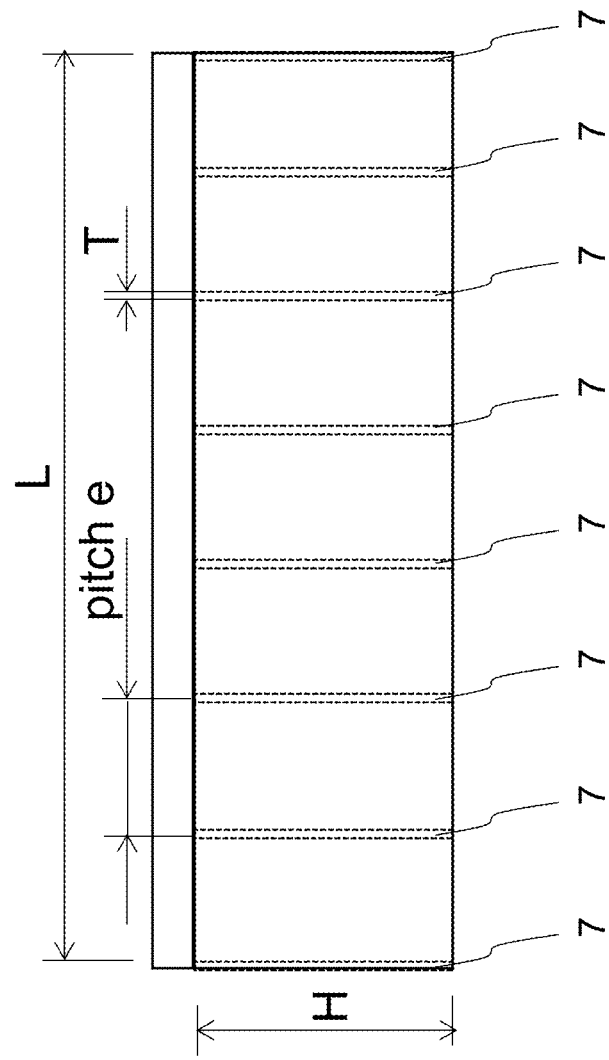
FIG. 8B
FIG. 8A
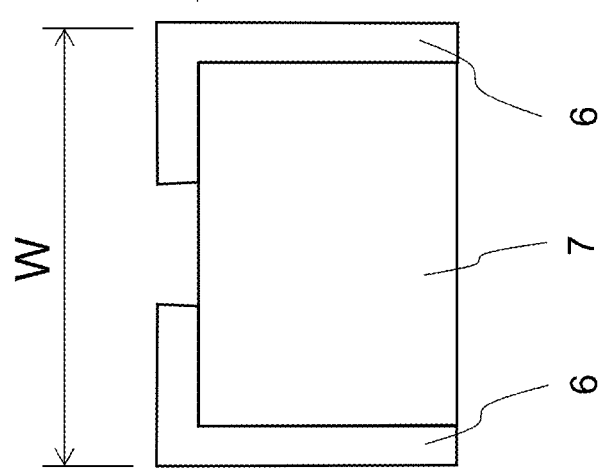

IMAGE READING DEVICE HAVING AN OVERLAP PREVENTER WITH SLIT PLATES

CROSS-REFERENCE TO RELATED APPLICATIONS

The present application is based on PCT filing PCT/JP2021/020886, filed Jun. 1, 2021, which claims priority to JP 2020-160321, filed Sep. 25, 2020, the entire contents of each are incorporated herein by reference.

TECHNICAL FIELD

The present disclosure relates to an image reading device that causes convergence of light transmitted through or reflected from a reading target, that is, an irradiated body, with a lens array arranged in an array and that performs reading of the converged light with a sensor element array.

BACKGROUND ART

Some types of conventional image reading device, that is, some types of an image-reading line image sensor and an image input device including the image sensor, (i) emit light onto a reading target, (ii) converge light transmitted through or reflected from the reading target with rod lenses arranged in an array, and (iii) read the converged light with an array of linearly-arranged optical sensors (refer to, for example, Patent Literature 1). Such image reading device is used in an image reading apparatus such as a copier or a scanner that translates, into electronic information, images, characters, patterns, or the like on the reading target.

Examples of a lens array in an image reading device include a rod lens array and a microlens array for an erecting equal magnification optical system. Such a lens array is used in an apparatus such as a copier or a scanner that is used for digitization of information such as images, characters, and patterns printed on a paper medium or the like. Patent Literature 1 discloses an image reading device, that is, a line image sensor, that, with a rod lens array of rod-shaped lenses arranged in an array in accordance with a reading width, focuses reflection light or transmission light including information of a reading target illuminated by a line light source onto an optical sensor array arranged opposite to the reading target with respect to the lens array to perform reading.

The rod lens array disclosed in Patent Literature 1 includes rod lenses that are arranged in an array and that are formed from an inorganic material such as glass or from a resin or the like with a refractive index distributed in a radial direction thereof to form an erecting equal magnification optical system with a predetermined angular aperture and a predetermined conjugate length. Due to this configuration, a continuous linear image is obtainable.

Furthermore, in recent years, rod lens arrays have uses other than those in an input unit of a facsimile machine or the like such as those in backside-reading line image sensors installed in an automatic document feeder (ADF) in a document scanner or a copier, and those in a manufacturing line such as for printing inspection or film inspection in a commercial printing line. This is because a rod lens, although having a fixed focus, has a short conjugate length as the distance between focal points, and thus can form an image input system that is more compact than conventional optical systems that focus a reduced image onto a small sensor surface.

As the range of applications widens, attempts are considered, for yet wider application, to achieve improvement in shortness of the conjugate length that has been a contributing factor in miniaturization of image sensor products. For wider application, improvement in depth of field that is tolerance for a positional relationship between a focal position and a reading target, that is, by overcoming shallow or small depth of field, is required. In particular, in the case of image inspection, that is, in-line inspection of paper printing or film printing, a reading target may be conveyed at a high speed of 200 m/min or higher, and thus improvement is required with respect to a change in resolution of an image to be read that may possibly occur in response to flapping of the reading target due to the high-speed conveyance.

Against such background, various investigations are carried out to increase the depth of field in a line image sensor. For example, Patent Literature 1 discloses disposing an overlap limiter between lens elements in a lens element body to limit overlap of images formed by the lens elements, thereby controlling a diameter for image formation of each lens element to increase the depth of field, that is, improve the depth of field.

As another example, Patent Literature 2 discloses using an opaque, light-absorption layer around rod lenses to prevent occurrence of low resolution due to overlap of images formed by the rod lenses and to cause an array of the rod lenses to have depth-of-field characteristics close to the depth-of-field characteristics of a single rod lens, thereby increasing the depth of field, that is, improving the depth of field, of the rod lens array as a whole.

As still another example, Patent Literature 3 discloses arranging rod lenses with an opaque, light-absorption layer disposed around the rod lenses and with gaps left between the lenses to achieve uniform characteristics of the rod lens array, thereby reducing variations in an amount of light or in resolution between the lenses generated in the configuration disclosed in Patent Literature 2 and increasing the depth of field, that is, improving the depth of field.

CITATION LIST

Patent Literature

Patent Literature 1: Unexamined Japanese Patent Application Publication No. H6-342131
Patent Literature 2: Unexamined Japanese Patent Application Publication No 2000-35519
Patent Literature 3: WO2013/146873

SUMMARY OF INVENTION

Technical Problem

A line image sensor including a rod lens array has a problem in the securing of depth of field. Various techniques are developed heretofore for improvement in the depth of field to the same level as that of a single lens. The technique disclosed in Patent Literature 1 has a problem in that limitation to light incident on the limiter at a low incident angle is not provided.

Such technique as disclosed in Patent Literature 1 commonly uses a general-purpose product as a lens array and limits optical paths of light emitted from lenses by use of a light blocking member prepared in advance as a light blocking member having a pitch matching a pitch of fixed lenses, for improvement in depth of field. On the other hand, an optical system is formed by combining the blocking member and a lens array 1 in which, based on the assumption of forming a group of light blockers in one member or of combining multiple groups of light blockers, rod lenses are disposed on a flat plate with managed-arrangement as an array but without individual management of the position of each of the rod lenses.

For this reason, such technique as disclosed in Patent Literature 1 has a problem of difficulty in the accurate arranging of the light blocking member at a predetermined position in accordance with dimensional variability that a rod lens array including rod lenses with an actual diameter of 0.3 to 1.0 mm may possibly have, such as variation in a thickness of each rod lens and variation in an arrangement pitch.

Furthermore, since the light blocking member is included as a separate component, continually maintaining a constant positional relationship between the light blocking member and the rod lenses in response to a change in dimensions due to thermal expansion or contraction of the lens array due to a change in a temperature or humidity that may possibly occur in performing image capturing by a sensor system with lenses having configuration as that disclosed in Patent Literature 1 is difficult. Additionally, prevention is difficult of the occurrence of a severe decrease in quality of an image due to occurrence of a multiple image or shading image due to changes in a position of each lens of the lens array and a position of the blocking member.

The present disclosure is made to solve the aforementioned problems and relates to an image reading device having a highly-accurate structure that enables an easy increase in the depth of field, that is, improvement in the depth of the field, without need for a change in basic characteristics of lenses.

Solution to Problem

An image reading device according to the present disclosure includes (i) a lens array including lenses that are sandwiched between two fixing plates extending along a main scanning direction and are arranged in an array along the main scanning direction, (ii) a sensor element array including sensor elements that are arranged in an array along the main scanning direction and are each to receive light converged by the lenses, and (iii) an overlap preventer disposed between the lens array and the sensor element array to prevent overlap of images formed by the lenses. The overlap preventer is a slit section including a plurality of slit plates arranged in the main scanning direction and extending in a sub-scanning direction to partition off a space, and the slit plates are fixed to the fixing plates.

Advantageous Effects of Invention

As described above, according to the present disclosure, an image reading device is obtainable in which limitation to the optical path is provided with high-accuracy positional configuration to prevent light that is specific light incident at a low incident angle from directly entering the sensor elements, and thus an increase in the depth of field, that is, improvement is the depth of field, can be achieved while suppressing a decrease in an amount of light.

BRIEF DESCRIPTION OF DRAWINGS

FIGS. 8A and 8B illustrate configuration of the overlap preventer of the image reading device according to Embodiment 1;

DESCRIPTION OF EMBODIMENTS

In Embodiments 1 and 2, explanation of basic configuration of a slit section and explanation of a specific-light blocking member that can be used in an image reading device according to Embodiment 3 are provided. In Embodiment 3, explanation relating to fixation of the slit section is provided.

Embodiment 1

Figure 1A:
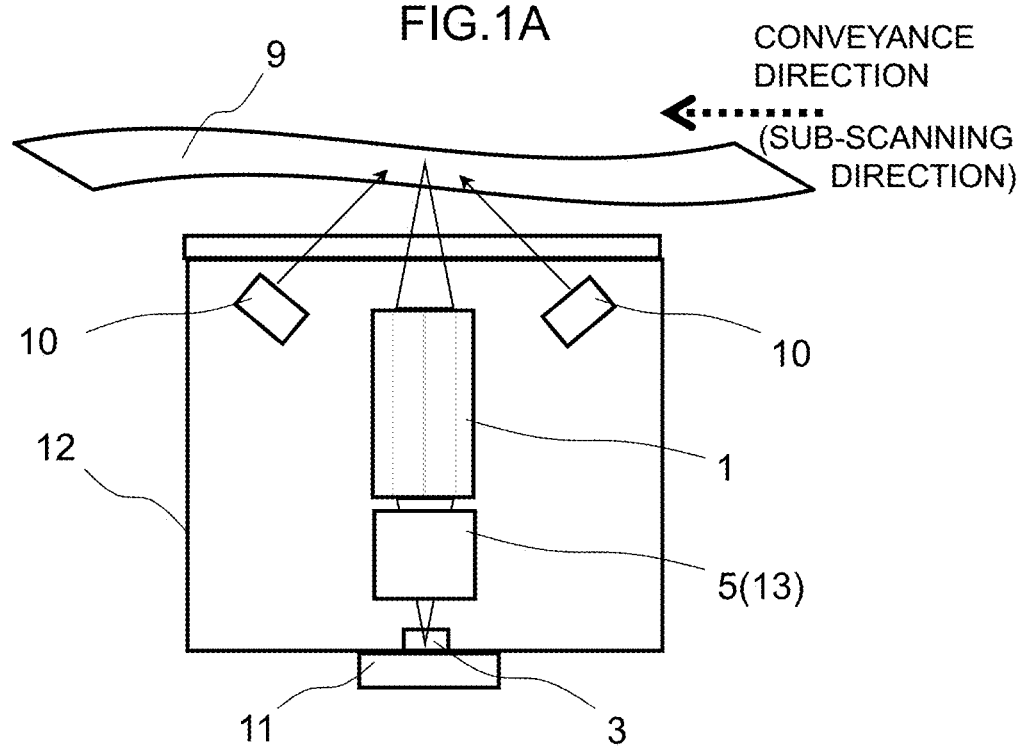
FIGS. 1A and 1B illustrate configuration of an image reading device according to Embodiment 1.
Figure 1B:
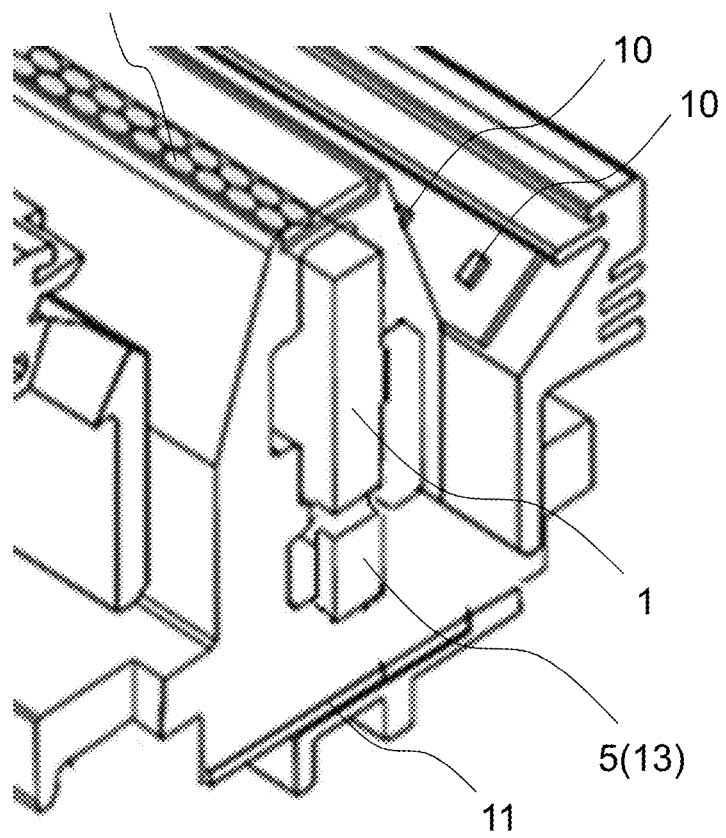
Figure 2:
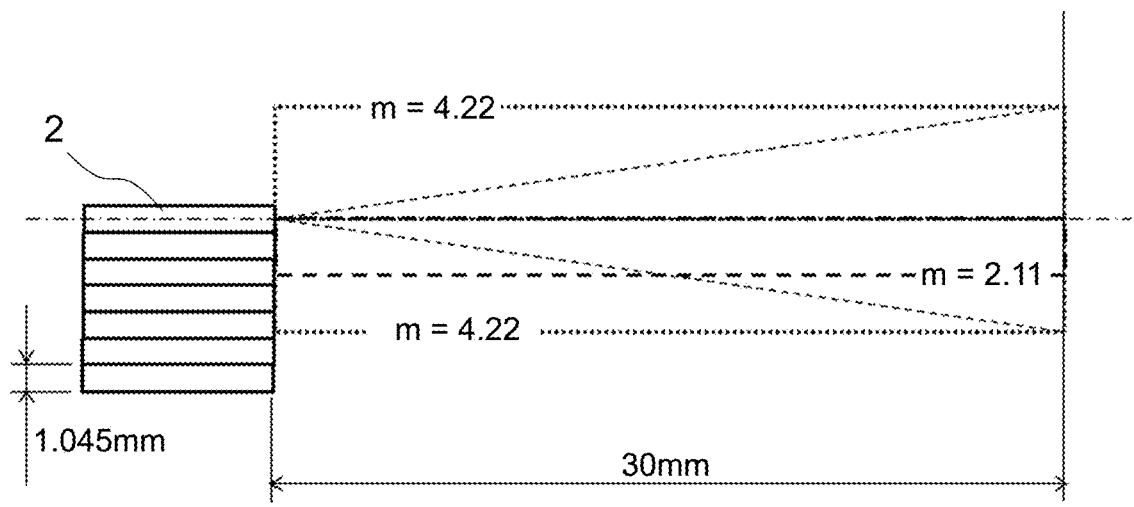
FIG. 2 illustrates overlap of images in the image reading device.
Figure 3A:
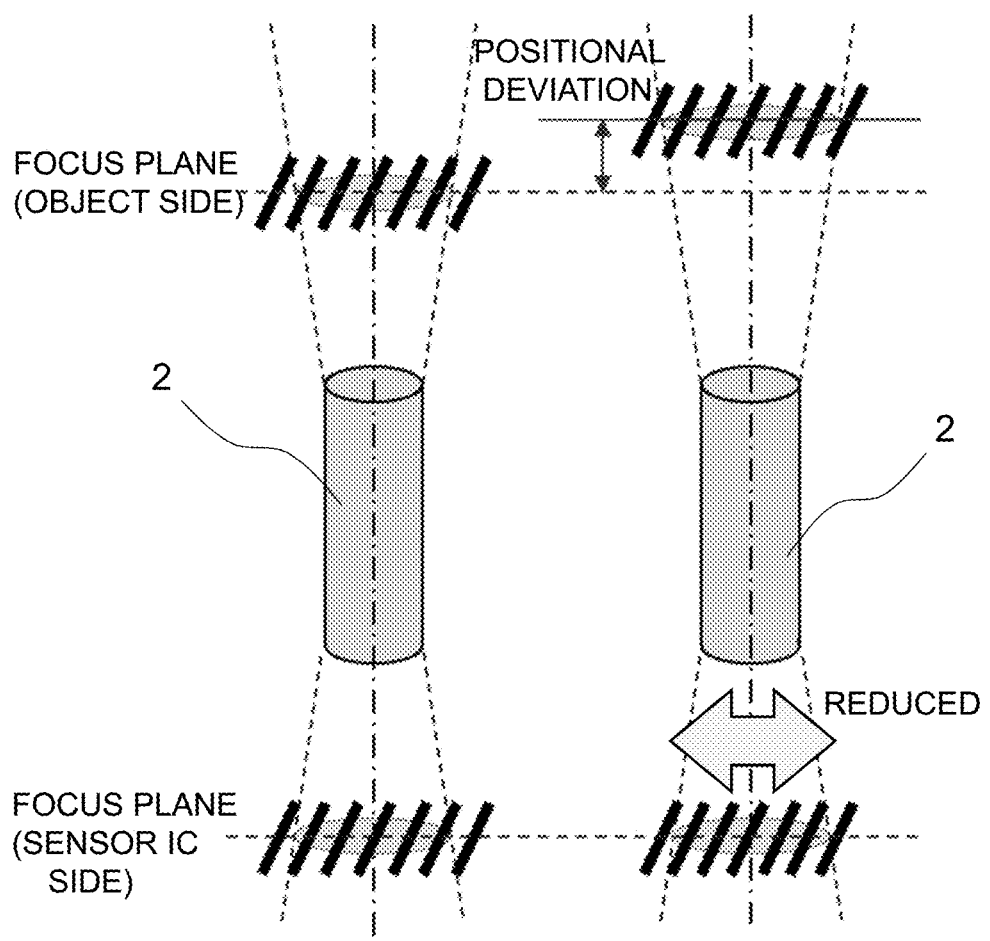
FIGS. 3A and 3B illustrate overlaps of images in the image reading device.
Figure 3B:
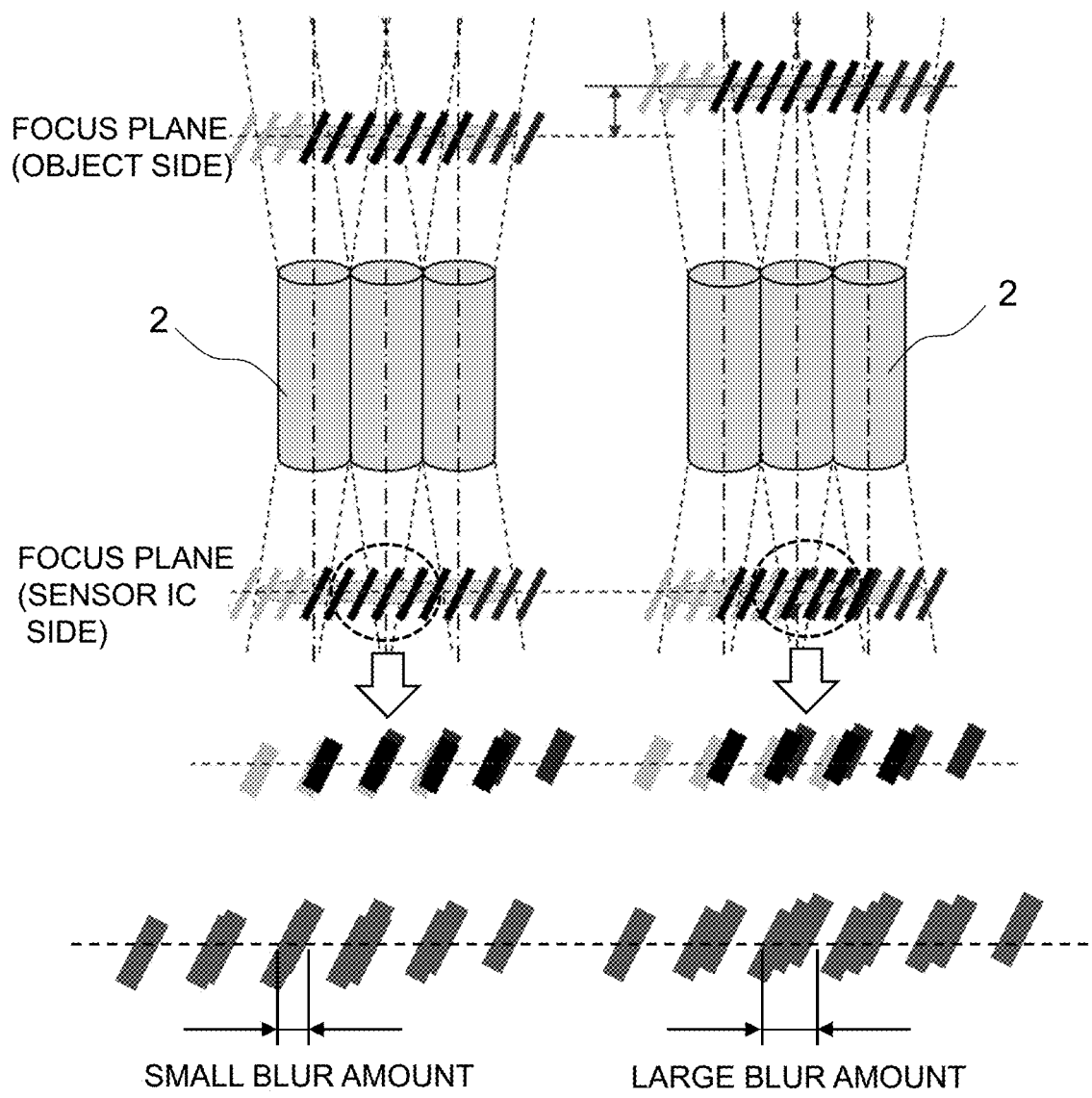

Hereinafter, Embodiment 1 is described with reference to FIGS. 1 to 12. In the drawings, the same reference sign is assigned to the same or equivalent components, and detailed description of such components is omitted. FIG. 1A is a cross-sectional view of an image reading device taken along a plane parallel to a sub-scanning direction that is a conveyance direction. FIG. 1B is a partial perspective view of the image reading device. FIG. 3A illustrates images that are each formed by a single lens that is a rod lens in the image reading device. FIG. 3B illustrates overlaps of images formed by a lens array that is a rod lens array in the image reading device.

In FIGS. 1 to 12, a lens array 1 includes lenses 2 arranged in an array along a main scanning direction of the image reading device. The main scanning direction and the sub-scanning direction that is the conveyance direction intersect each other, or more preferably, are orthogonal to each other. The main scanning direction and the sub-scanning direction that is the conveyance direction are orthogonal to a focal depth direction that is a direction of the depth of field. In the present disclosure, example cases are described in which an optical axis direction of the lens array 1, that is, an optical axis direction of the lenses 2, is orthogonal to the main scanning direction and to the sub-scanning direction that is the conveyance direction. Although example cases in which each lens 2 is a rod lens 2, that is, example cases in which the lens array 1 is a rod lens array 1, are described in the present disclosure, the lens array 1 may be, for example, a microlens array 1. The rod lens 2, a microlens 2, or the like for an erecting equal magnification optical system is suitable as each lens 2. More specifically, in the lens array 1, the lenses 2 sandwiched between two fixing plates extending along the main scanning direction are arranged in an array along the main scanning direction. The lenses 2 are sandwiched between the two fixing plates, and encapsulation resin that is fixing resin is filled in gaps therebetween. In some of the drawings, the fixing plates and the encapsulation resin that is the fixing resin are illustrated integrally, to simplify illustration of the fixing plates and the encapsulation resin that is the fixing resin.

In FIGS. 1 to 12, a sensor element array 3 includes sensor elements 4 that are sensor ICs 4 arranged in an array along the main scanning direction. Each of the sensor elements 4 receive light converged by the lenses 2. A slit section 5 is disposed between the lens array 1 and the sensor element array 3 to prevent overlap of images formed by the lenses 2. The slit section 5 includes multiple slit plates 7 arranged in the main scanning direction and extending in the sub-scanning direction to partition off a space, and multiple spaces are defined in an array along the main scanning direction so as to have a one-to-one correspondence to the lenses 2. That is, configuration in which the slit section 5 has a slit portion for each of optical axes of the lenses 2 is illustrated. Of course, the slit section 5 need not have slit portions of the same number as that of the pitches between the lenses 2. For example, the slit section 5 may have a slit portion for each one and a half of the lens 2. That is, multiple spaces may be defined in an array along the main scanning direction so as to have a "one-to-one and a half" correspondence to the lenses 2. The slit section 5 includes sidewall plates 6, the slit plates 7 and specific-light blocking members 8. The slit portions of the slit section 5 are defined by the sidewall plates 6 and the slit plates 7. The slit section 5 can also be referred to as an overlap preventer 5 that is an optical path limiter. FIG. 8A and FIG. 11A are cross-sectional views of the slit section 5 taken along a plane parallel to the sub-scanning direction that is the conveyance direction. FIG. 8B and FIG. 11B are cross-sectional views of the slit section 5 taken along a plane parallel to the main scanning direction.

In FIGS. 1 to 12, a reading target 9 that is an illumination target 9 or an object 9 is a component that carries, mainly on a surface thereof, objects to be represented by electronic information, such as images, characters, and patterns. Examples of the reading target 9 include (i) a sheet-like component such as a document, a banknote, or a securities certificate, (ii) a substrate and (iii) a web such as fabric or cloth. The reading target 9 is conveyed in the sub-scanning direction that is the conveyance direction. Light sources 10 emit light onto the reading target 9. The lens array 1, that is, the lenses 2, converges light reflected from or transmitted through the reading target 9. In the present disclosure, example cases are described in which each of the light sources 10 is an LED array and light emitted from the light sources 10 and reflected by the reading target 9 is converged. A sensor substrate 11 is a substrate that includes the sensor element array 3, that is, the sensor elements 4. A housing 12 is a housing for the image reading device that holds or accommodates (i) the lens array 1, that is, the lenses 2, (ii) the sensor substrate 11, that is, the sensor element array 3, or in other words, the sensor elements 4, (iii) the slit section 5, and (iv) the light sources 10. The light sources 10 and the sensor substrate 11 may be disposed outside the image reading device, that is, outside the housing 12. The conveyance of the reading target 9 in the sub-scanning direction that is the conveyance direction may be performed by conveying the reading target 9 or by conveying the image reading device, that is, conveying the housing 12.

That is, the image reading device according to Embodiment 1 can be said to be a line image sensor that includes the light sources 10 and the sensor element array 3 with the rod lens array 1 located in between and in which the light sources 10 illuminate a portion of the reading target 9 at the center of reading for the rod lens array 1 and the sensor element array 3 converts a medium image formed by the rod lens array 1 into an electric signal. The role of the slit section 5 in the image reading device according to Embodiment 1 that is the line image sensor and the basic functions of the slit section 5 are described in detail below.

First, the role of the slit section 5 is described in detail. The point to be improved of the line image sensor using the rod lens array 1, as in the above description of the problem to be solved, is the securing of depth of field. An entire image formed by an imaging optical system, that is, by lenses, is not formed with a single rod lens 2 alone. As illustrated in FIGS. 2, 3A and 3B, the multiple rod lenses 2 form images that overlap one another to form the entire image.

A low depth of field is mainly caused, rather than by the characteristics of each single lens, by arrayed lenses with which, as illustrated in FIGS. 2, 3A and 3B, images formed by adjacent lenses of a number defined by an overlap degree m are not superimposed at a regular position. The overlap degree m is a half of a value obtained by dividing, by a diameter of the rod lenses 2, a diameter of an area to which a single rod lens 2 transfers an image at the conjugate point. The images not superimposed at the regular position produce a blurred image. The overlap degree m denotes a parameter indicating the overlap degree of images formed by adjacent rod lenses 2 and indicates the number of lenses that form overlapping images in one direction of each rod lens 2 from a central optical axis of the rod lens 2.

Since the rod lenses 2 are arrayed, as illustrated in FIG. 2, at the conjugate point, an area in which an image is formed by a single rod lens corresponds to an area of m lenses in each direction from a center of the lens, as indicated by the overlap degree. This indicates that light passed through 2×m rod lenses 2 is used to form a single image, and to guarantee an intended resolution at the conjugate point, all the lenses are to have the same characteristics and to be arranged without errors to form images at the same point. However, since the rod lenses 2 vary in optical characteristics and have assembly errors, and images transferred from the rod lens 2 slightly deviate from one another, and additionally, with respect to the resolution at the conjugate point, optical characteristics are lower than those achieved with a single rod lens 2.

As illustrated on the left side in FIG. 3A, in a case in which the reading target 9 and the sensor array 3 have a positional relationship so as to be located at the conjugate points, the rod lens 2 forms an erecting equal magnification image. However, as illustrated on the right side in FIG. 3A, in a case in which the reading target 9 is moved, that is, recedes, from the conjugate point, that is, from the focal position or focus plane in this drawing, a reduced image is formed on the sensor element array 3. In this case, the images formed by the each of the rod lenses 2 are reduced on the sensor element array 3, and thus the images formed on the sensor element array 3 by the rod lenses 2 as images formed by the rod lens array 1 slightly deviate from each other. This leads to, as illustrated on the right side in FIG. 3B, a larger amount of blur and a lower resolution than in the case as illustrated on the left side in FIG. 3B.

Figure 4:
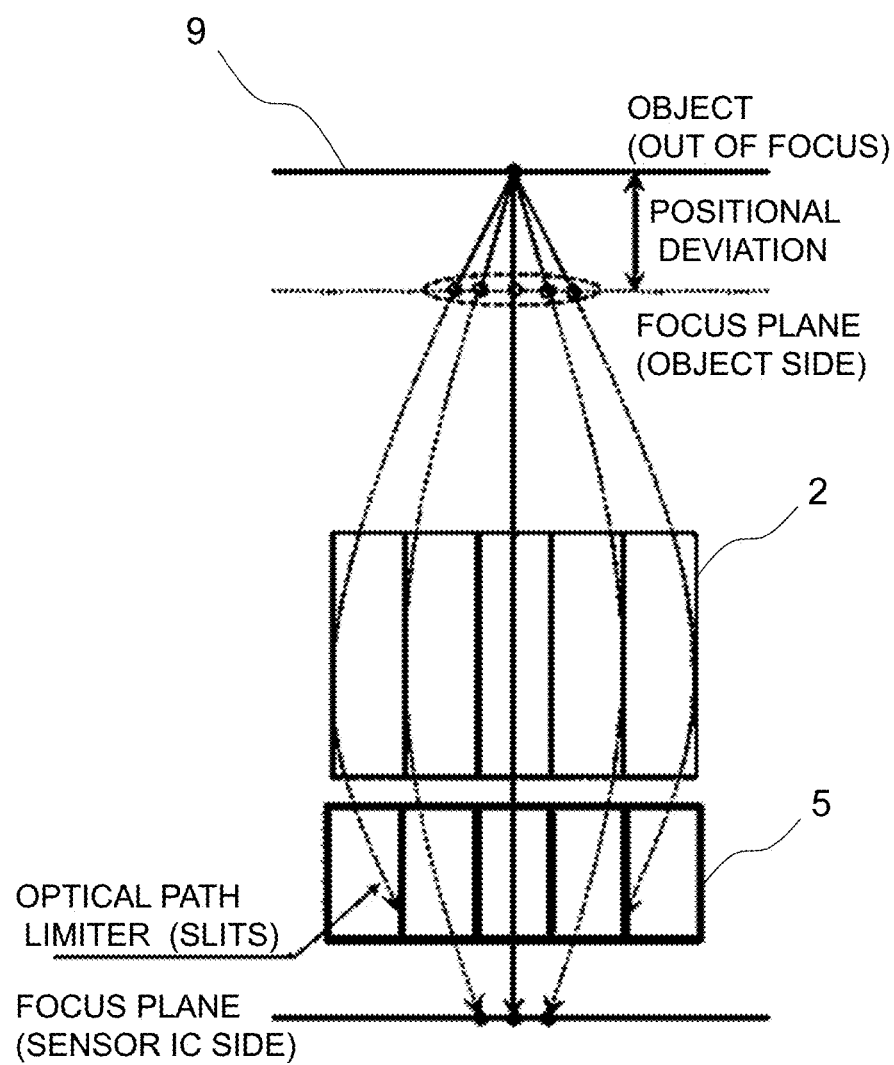
FIG. 4 is a diagram for explanation of configuration of an overlap preventer, that is, an optical path limiter, of the image reading device according to Embodiment 1.

The low depth of field resulting from the low resolution due to a greater distance of the position of the reading target 9 from the conjugate point, that is, from the focal position, is not mainly caused by the characteristics of each rod lens 2. The reduced depth of field is mainly caused by the rod lens array 1 that is an array of the rod lenses 2, that is, caused through forming of a blurred image resulting from images formed by the rod lenses 2 on the sensor element array 3 that are not superimposed at a regular position and deviate from each other due to (i) the difference in characteristics of the adjacent rod lenses 2 defined by the aforementioned overlap degree m, (ii) misalignment of the optical axes of the adjacent rod lenses 2 due to assembly errors, and (iii) enlargement or reduction of images due to deviation of the reading target 9 from the focal position. Thus, as illustrated in FIG. 4, the slit section 5 is used to avoid such low depth of field.

Figure 5:
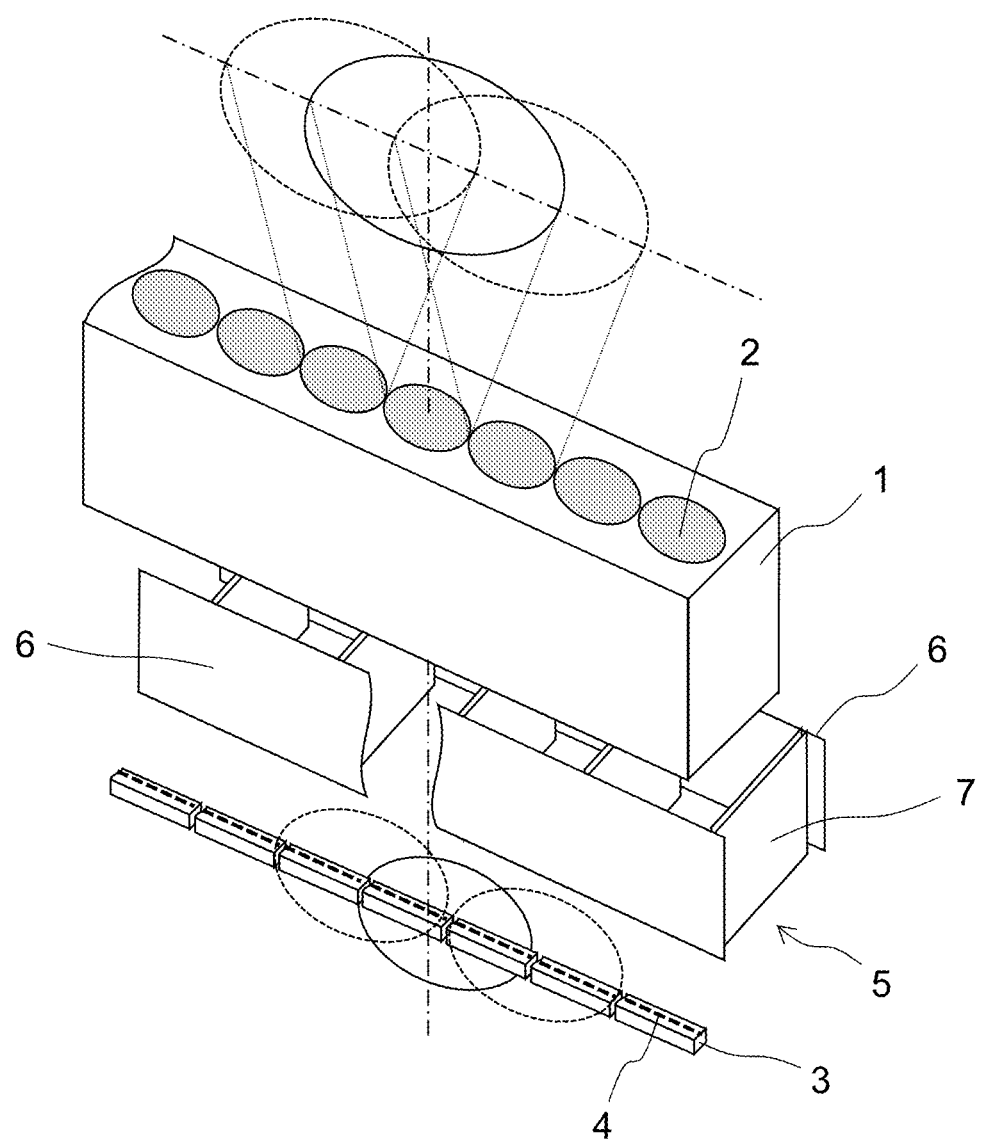
FIG. 5 illustrates configuration of a lens array, the overlap preventer and a sensor element array of the image reading device according to Embodiment 1.
Figure 6:
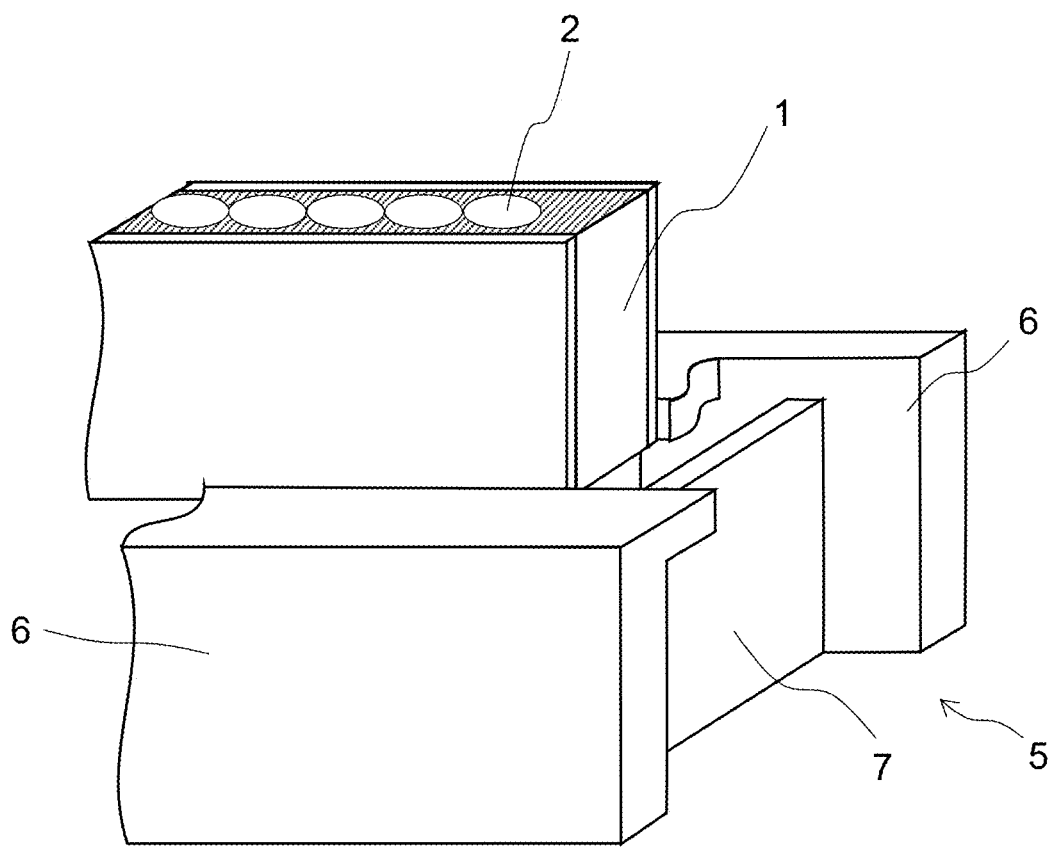
FIG. 6 illustrates configuration of the lens array and the overlap preventer of the image reading device according to Embodiment 1.

Next, the basic functions of the slit section 5 of the image reading device according to Embodiment 1 are described in detail with reference to FIGS. 5 to 9. The rod lenses 2 simply illustrated in FIGS. 5 and 6 each are SLA (product name; SLA9A) with a single row manufactured by Nippon Sheet Glass Co., Ltd, with "an angular aperture of 9°, a conjugate length of about 80 mm, a lens diameter Φ of about 1.0 mm, and an overlap degree m of 4.2". FIGS. 5 and 6 illustrate arrangement of the slit section 5 with respect to the rod lens array 1. The slit section 5 illustrated in FIGS. 7 and 8 has a length L in the main scanning direction, a width W in the sub-scanning direction, and a height H in the optical axis direction. A length of each of the sidewall plates 6 in the main scanning direction corresponds to the length L. A length, that is, a height, of each of the slit plates 7 in the optical axis direction corresponds to the height H. The slit plates 7 are disposed at a pitch e of about 2.0 mm in the main scanning direction, and each have a thickness T of 0.2 mm and a height H of 20 mm. In Embodiment 3 described below, the slit plates 7 are disposed at a pitch e of about 1.0 mm in the main scanning direction, and each have a thickness T of 0.2 mm and a height H of 10 mm.

The slit section 5 illustrated in FIGS. 5 to 8 has wall surfaces that are black and velvety to minimize light reflection and block all rays of light incident on the surfaces of the slit section 5, including reflected light and scattered light. That is, the slit plates 7 and the specific-light blocking members 8 preferably have black surfaces. Further, the sidewall plates 6 preferably have black surfaces on at least surfaces contiguous with the slit plates 7. Moreover, black and velvety surfaces are suitable as the black surfaces. Examples of the black velvety surfaces include a black and textured surface.

Figure 7:
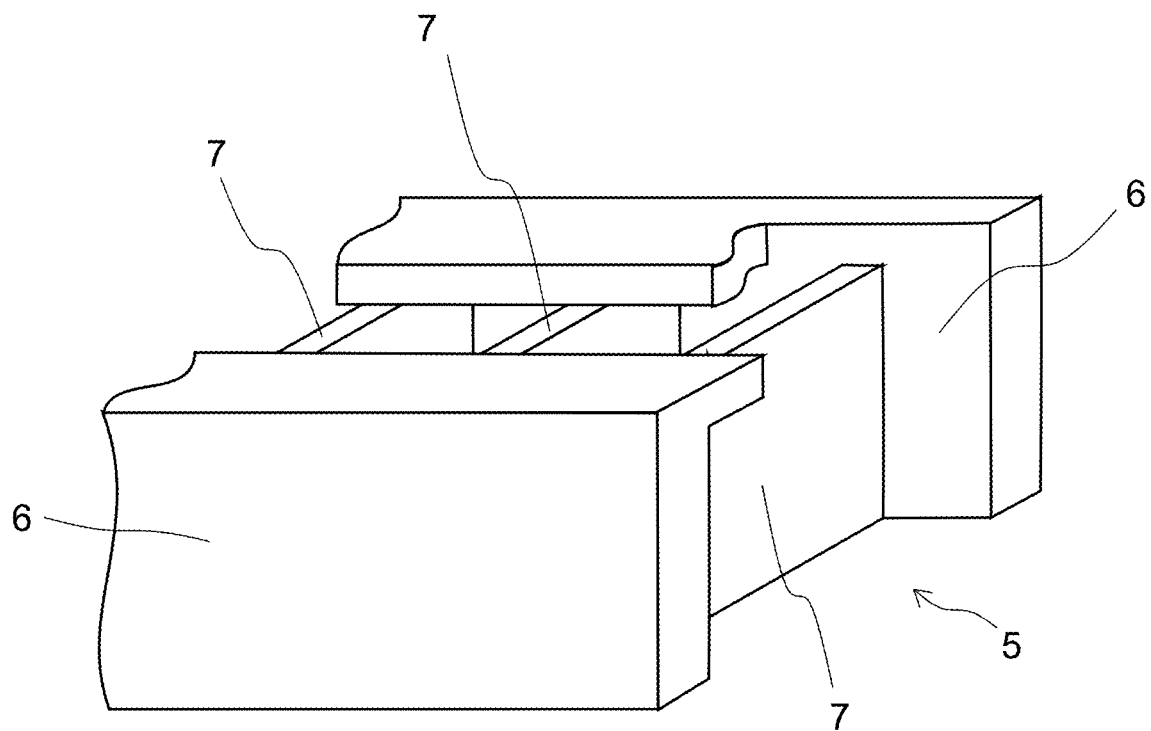
FIG. 7 illustrates configuration of the overlap preventer of the image reading device according to Embodiment 1.

In the slit section 5, the slit plates 7 are fixed with the sidewall plates 6 so as to be held with a regular distance kept between each slit plate. More specifically, the slit plates 7 are fixed with two sidewall plates 6. Thus, the sidewall plates 6 can also be referred to as spacers 6. In other words, the sidewall plates 6 that are spacers 6 are two components that extend in the main scanning direction and face each other in the sub-scanning direction intersecting the main scanning direction. The multiple slit plates 7 extend in the sub-scanning direction between the two sidewall plates 6 to partition off the space between the two sidewall plates 6 to form the slit portions of the slit section 5. As illustrated in FIGS. 6 to 8, each of the sidewall plates 6 may have a portion facing the rod lens array 1 and bent in the sub-scanning direction to partially cover the ends of each slit plate 7 to provide limitation to light incident on the slit section 5. In this case, each of the sidewall plates 6 is a plate that has an L-shaped cross section in a plane parallel to the sub-scanning direction.

Mechanical dimensions of the slit section 5 are preferably determined in the manner described below when the overlap degree that is a half of the value obtained by dividing by the lens diameter Φ the diameter of an area to which a single rod lens 2 transfers an image at the conjugate point is taken to be m and an angular aperture is taken to be θ for the rod lens 2. The pitch e between adjacent slit plates 7 of the multiple slit plates 7 is smaller than or equal to a value obtained by multiplying the overlap degree m and the lens diameter Φ by 0.6. The length of the slit section 5, that is, the length of the slit plates 7 on the optical path, is greater than or equal to a value obtained by dividing the pitch e by a tangent θ when the rod lens 2 has an angular aperture θ. That is, from the relationships for the pitch e of the slit plates 7, $e \leq 0.6 \times m \times \Phi$, and the height H of the slit plate 7, $H \geq e/\tan(\theta)$, the pitch e is about 2.0 mm from 0.5×m×1 mm, and the height of the slit plate 7, that is, the height of the slit section 5, is about 20 mm from 2.0/tan(6°) with a restriction of 6° allowing margin for the lens angular aperture. The height of the slit plate 7, that is, the height of the slit section 5, is a dimension in the optical axis direction that is a reading optical axis direction. One of the solid lines in FIG. 9 indicates the depth-of-field characteristics in the above conditions. The other solid line indicates the depth-of-field characteristics of a comparative image reading device.

In Embodiment 3 described below, the pitch e between adjacent slit plates 7 of the multiple slit plates 7 is taken to be equal to the lens diameter Φ, and the length of the slit section 5, that is, the length of the slit plates 7 on the optical path, is greater than or equal to a value obtained by dividing the pitch e by a tangent θ when the rod lens 2 has an angular aperture θ. That is, from the relationship for the height H of the slit plate 7, H≥e/tan(θ), the pitch e is 1 mm, and the height of the slit plate 7, that is, the height of the slit section 5, is about 10 mm from 1.0/tan(9°) with a restriction of 9° lens angular aperture.

Figure 9:
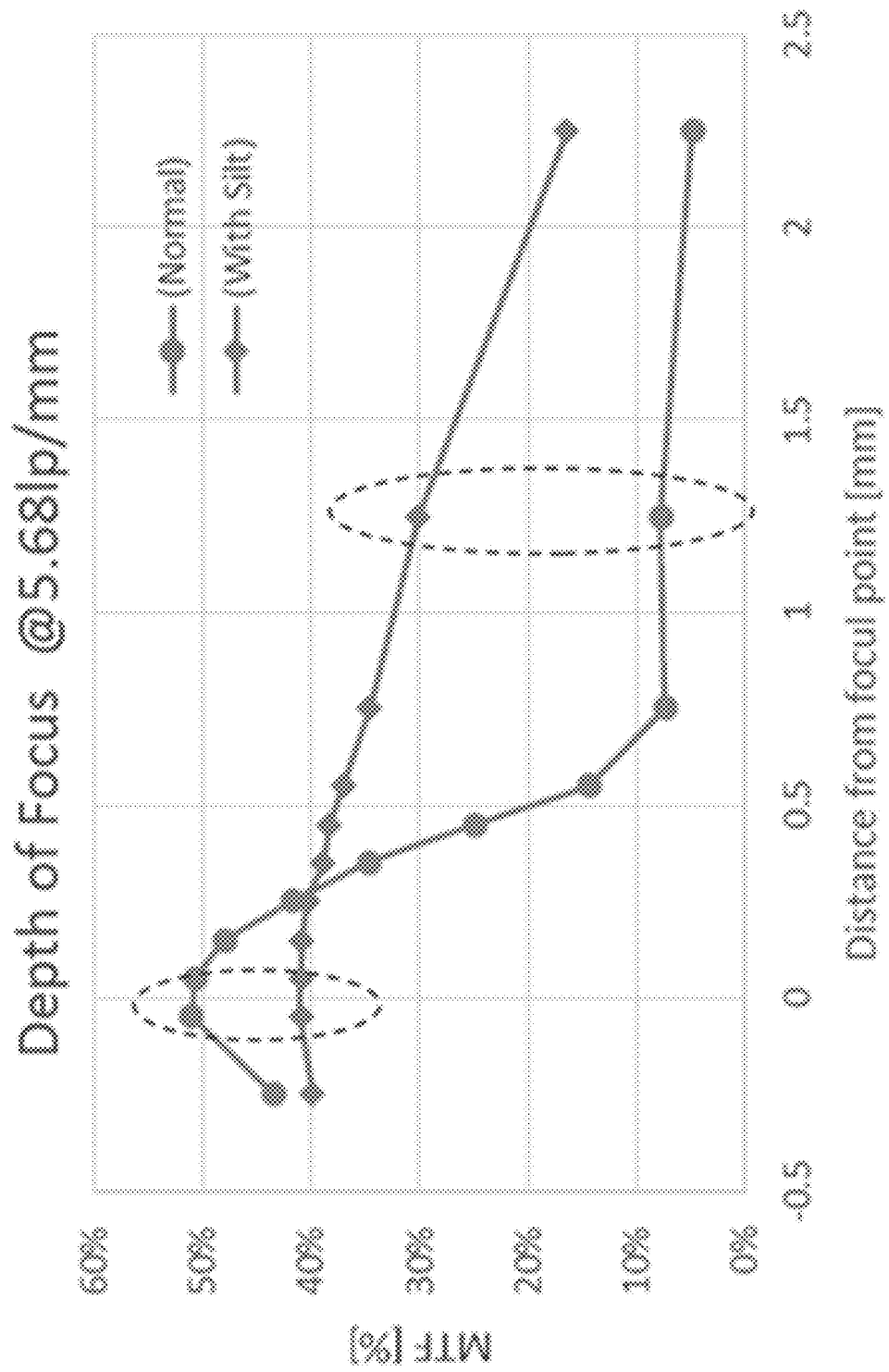
FIG. 9 illustrates depth-of-field characteristics of the image reading device according to Embodiment 1 and an image reading device according to a comparative example.

FIG. 9 illustrates the depth-of-field characteristics of image reading devices as values at a resolution of 5.681 lp/mm (line pairs/mm). In FIG. 9, black rhombuses assigned the phrase "with slit" indicate the depth-of-field characteristics of the image reading device according to Embodiment 1. Similarly, black circles assigned the term "normal" indicate the depth-of-field characteristics of an image reading device according to a comparative example. In detail, the image reading device according to Embodiment 1 is "with slit" and includes the slit section 5 that is the overlap preventer 5. The image reading device according to the comparative example is "normal" and does not include the overlap preventer 5. The vertical axis in FIG. 9 indicates the modulation transfer function (MTF) in %. The horizontal axis in FIG. 9 indicates the distance of the reading target 9 that is the object 9 from the focal position that is the focus plane or the focal point in mm.

The solid lines in FIG. 9 indicate a great improvement in the image reading device including the slit section 5 in the depth of field in reaction to a positional deviation of the reading target 9 in the reading optical axis direction that is the direction of the depth of field, in contrast to a slight decrease in the peak resolution at the focal position (see the right-side broken-line encircled portion in FIG. 9 in comparison with the left-side broken-line-encircled portion). The depth of field can be increased by about three times. In the case in which the black velvety surface of each slit plate 7, that is, the black velvety surface of the slit section 5, has a large reflectivity, the reflection produces a slight reflected image, and thus the conditions of the black velvety surface that is the surface of the slit section 5 are to be managed. As described above, examples of the black velvety surface include a black and textured surface.

Figure 10:
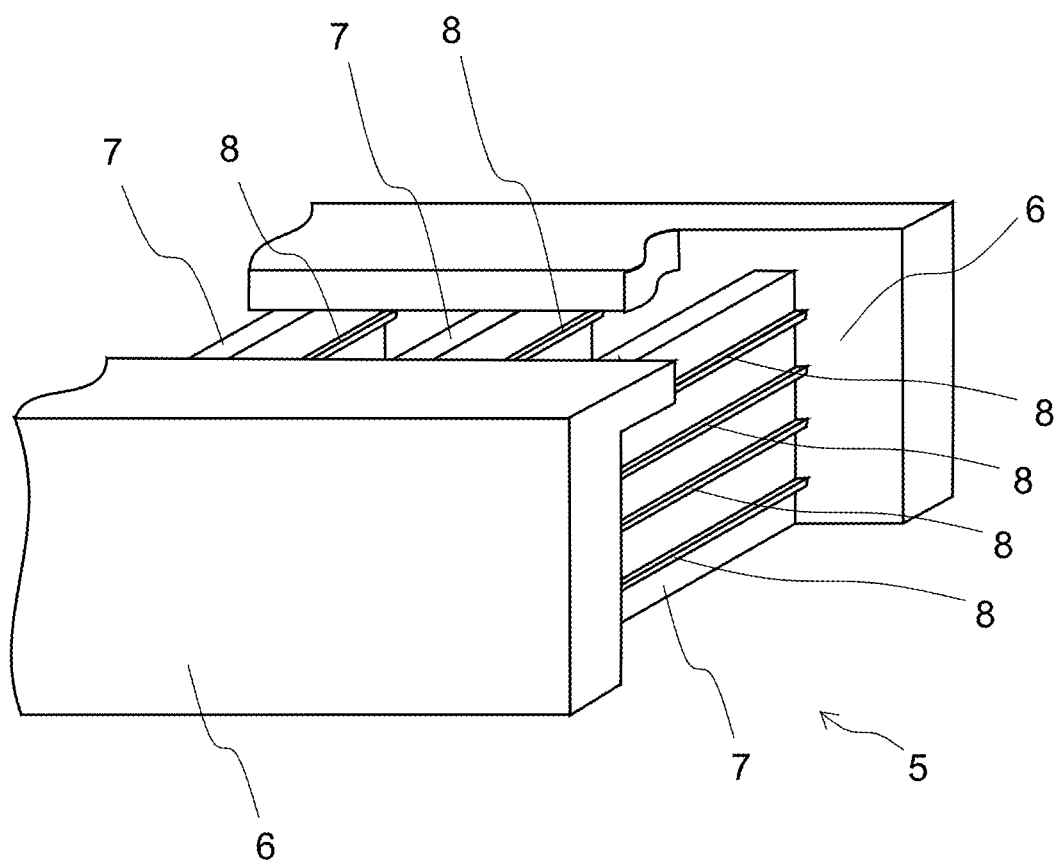
FIG. 10 illustrates configuration of the overlap preventer of the image reading device according to Embodiment 1.
Figures 11A, 11B:
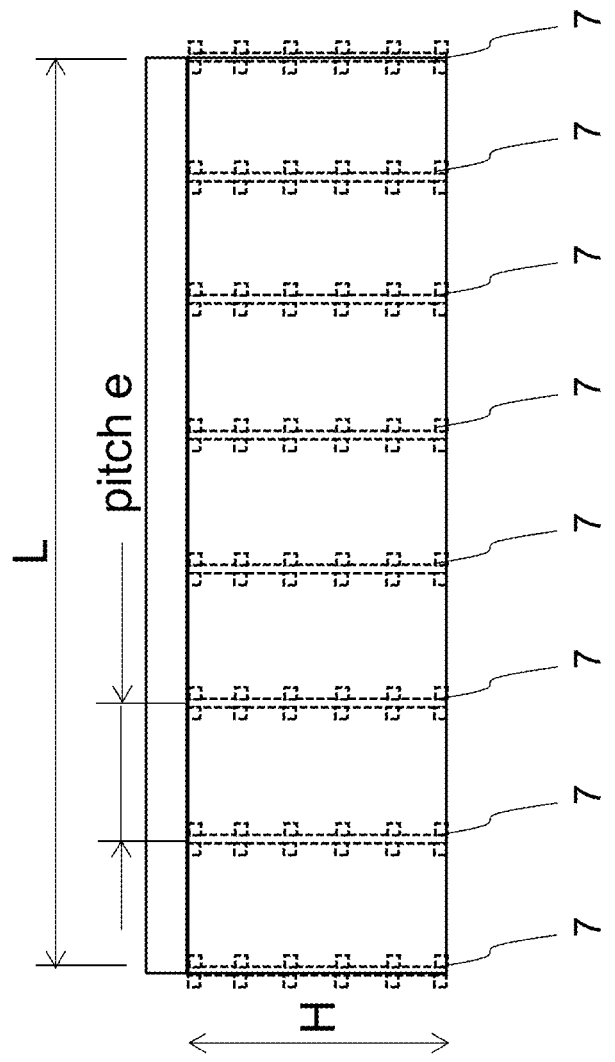
FIGS. 11A and 11B illustrate configuration of the overlap preventer of the image reading device according to Embodiment 1.
Figure 12:
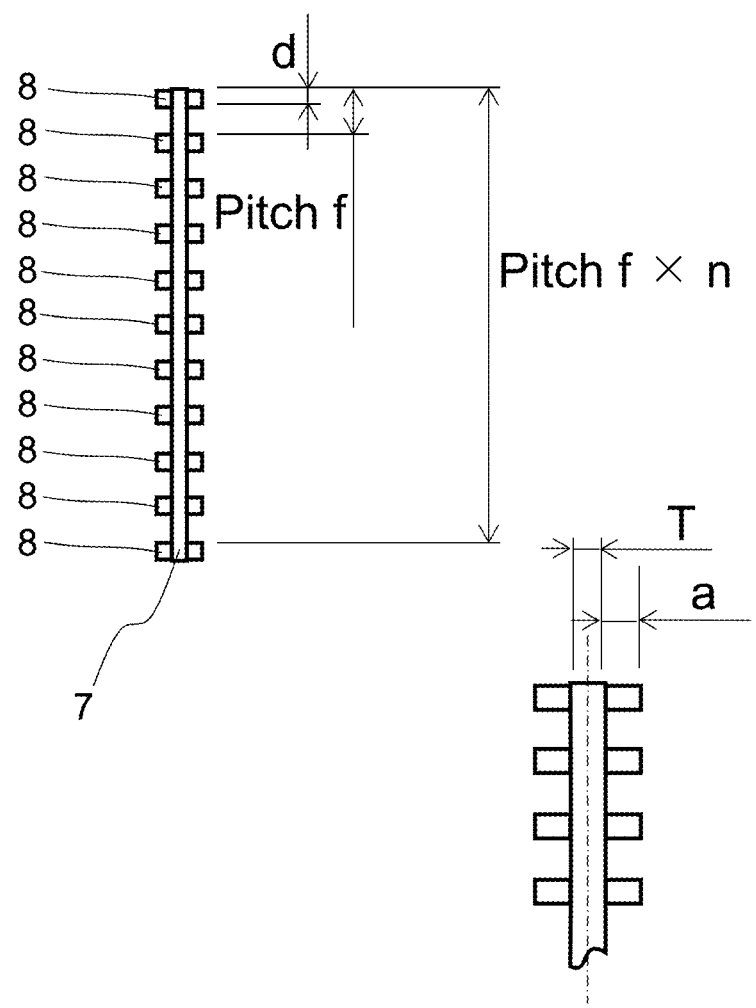
FIG. 12 illustrates configuration of the overlap preventer, that is, a slit plate and specific-light blocking members, of the image reading device according to Embodiment 1.

To block light more stably, the slit section 5 described above in the image reading device according to Embodiment 1 preferably further includes the specific-light blocking members 8 as illustrated in FIGS. 10 to 12. The specific-light blocking members 8 protrude from the slit plates 7 in the main scanning direction to block, from entering the sensor elements 4, specific light incident at an angle smaller than or equal to the angular aperture of the rod lenses 2. More specifically, the specific-light blocking members 8 have a mechanical shape to prevent light that is specific light incident at a low incident angle on the surface, that is, the wall surface, of the slit section 5 from directly entering the sensor elements 4. The specific-light blocking members 8 are beam-like members 8 extending between the sidewall plates 6. The beam-like members 8 that are the specific-light blocking members 8 may be non-contiguous with the sidewall plates 6. Each of the specific-light blocking members 8 preferably has a portion nearer the rod lenses 2 protruding further than a portion nearer the sensor elements 4. This configuration is described in Embodiment 2 in detail.

Multiple specific-light blocking members 8 as illustrated in FIGS. 10 to 12 are disposed, for example, on the slit plates 7 along the optical axes of the rod lenses 2. Specifically, black beams that are the specific-light blocking members 8 are disposed at regular intervals, on the wall surfaces of the slit plates 7 that have undergone a blackening treatment, in the reading optical axis direction that is perpendicular to an optical axis for reading. This structure causes reflection, toward the rod lenses 2, of light incident at a low incident angle on the specific-light blocking members 8, more specifically, on portions of beams, thereby preventing the light from entering the sensor element 4. A predetermined number of specific-light blocking members 8 that are the beam-like members can block light emitted at lens emission angle smaller than or equal to 9° from the rod lens 2 with a diameter of about 1 mm.

As illustrated in FIG. 12, the specific-light blocking members 8 that are the beam-like members each have a thickness d (dimension d in the optical axis direction) of 0.1 mm, a height a (dimension a in the main scanning direction, or height a protruding in the main scanning direction) of 0.1 mm, and are disposed at a pitch f (pitch for interval f) of 0.55 mm. The slit plates 7 have a thickness T of 0.2 mm. The height a (dimension a in the main scanning direction or height a protruding in the main scanning direction) and the pitch f of the specific-light blocking members 8 that are the beam-like members depend on an angular aperture θ of the rod lenses 2. That is, the height a and the pitch f preferably satisfy the relationship a/f≥tan(θ).

Due to the specific-light blocking members 8 that are the beam-like members, the conditions of the surface, that is, a wall surface, of the slit section 5 are less likely to have an effect, and stable characteristics become obtainable. Providing of the specific-light blocking members 8 that are the beam-like members, although producing a slight decrease in the peak resolution at the focal position, enables a great improvement in the depth of field in reaction to the positional deviation of the reading target 9 in the reading optical axis direction. The depth of field can be increased by about three times.

Embodiment 2

Figure 13:
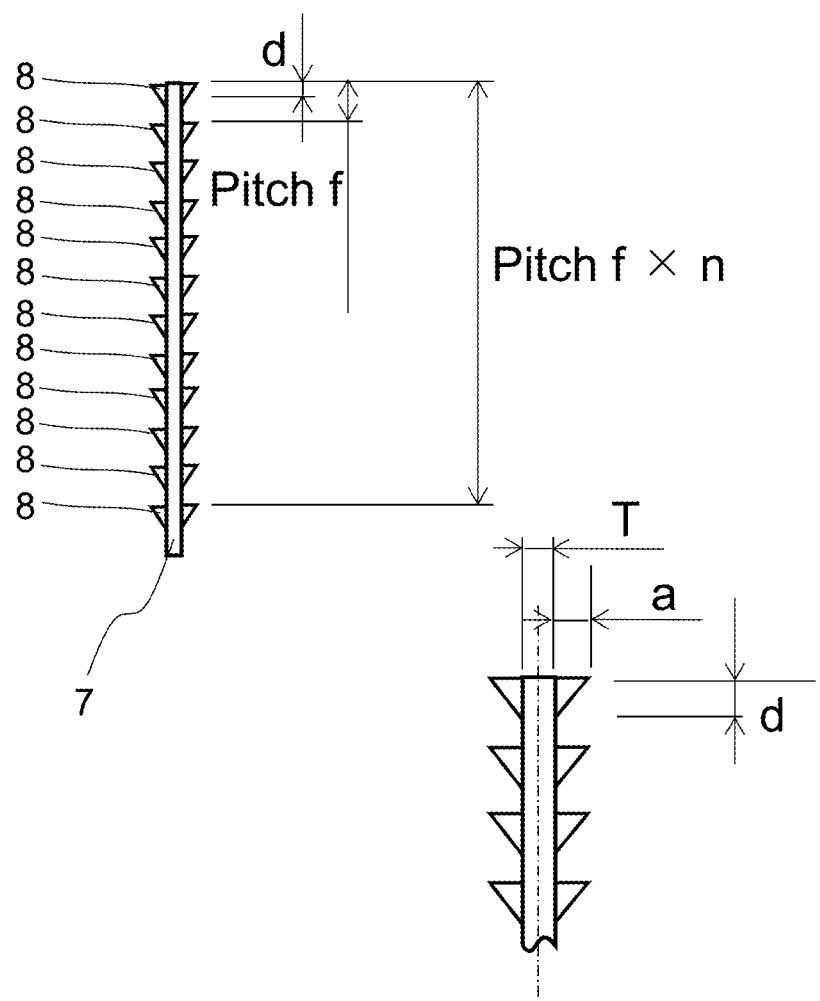
FIG. 13 illustrates configuration of the overlap preventer, that is, a slit plate and specific-light blocking members that are included in an image reading device according to Embodiment 2.

Embodiment 2 is described with reference to FIG. 13. Explanation of the same components or structures as those in Embodiment 1 is appropriately omitted. The same or corresponding components are assigned the same reference signs in this drawing and are not described in detail. As illustrated in FIG. 13, an image reading device according to Embodiment 2 includes specific-light blocking members 8 that are the beam-like members each having a portion nearer the rod lenses 2 protruding further than a portion nearer the sensor elements 4. In other words, the specific-light blocking members 8 that are the beam-like members have a lower height a (dimension a in the main scanning direction or height a protruding in the main scanning direction) nearer the sensor elements 4 than nearer the rod lenses 2. The specific-light blocking members 8 preferably have a right-angled triangular shape in an imaginary cross section in which the main scanning direction and the optical axis direction intersect each other. The hypotenuse of this right-angled triangle may be an arc instead of a precise straight line. The specific-light blocking members 8 in the image reading device according to Embodiment 1 each have a rectangular shape in an imaginary cross section in which the main scanning direction and the optical axis direction intersect each other.

With the specific-light blocking members 8 included in the image reading device according to Embodiment 2, since the hypotenuse of the right-angled triangle forming the profile of each of the specific-light blocking members 8 is inclined with respect to the optical axis direction, reflection of light by the specific-light blocking members 8 toward the sensor element 4 can be further reduced. Thus, in the case of employing, in the specific-light blocking members 8 that are the beam-like members in the image reading device according to Embodiment 2, the same thickness d (dimension d in the optical axis direction), the same pitch f (pitch for interval f), the same entire dimension t for the slit plates 7 including the specific-light blocking member 8 in the main scanning direction, and the same height a (dimension a in the main scanning direction or height a protruding in the main scanning direction) as the specific-light blocking members 8 in the image reading device according to Embodiment 1, due to the specific-light blocking members 8 that are the beam-like members having a shorter height a nearer the sensor elements 4, an image reading device with an increased depth of field and a more stable image quality is obtainable. The image reading device according to Embodiment 2 preferably also satisfy the relationship $a/f \geq \tan(\theta)$.

As described above, according to the image reading devices according to Embodiments 1 and 2, limitation is provided for the optical path to prevent light that is specific light incident at a low incident angle from directly entering the sensor elements 4. This configuration thus enables increasing the depth of field, that is, improving the depth of field, while suppressing a decrease in an amount of light.

The below described problem remains in improvement as disclosed in Patent Literature 2, that is, improvement of the depth of field in each single rod lens. That is to say, there is difficulty in achieving the uniform resolution or brightness in reaction to positional deviation of a reading target in the depth direction, as described in Patent Literature 3. Further, in the case of using a long line sensor with the technique disclosed in Patent Literature 2, a change in distribution of brightness occurs due to environmental changes, in particular, due to changes in relative positions of lenses and a sensor array due to a difference in thermal expansion caused by temperature changes. This change produces unevenness in illumination or sensitivity independently of whether shading compensation is performed in advance, thereby degrading the image quality. Moreover, improving the depth of field of each rod lens requires a reduction in the size of an area for a part functioning as a lens to allow the lens to be independent. This structure leads to a dark image due to a reduction in the amount of light for image formation or requires use of needlessly bright lighting, and thus a faster reading system is unlikely to be achieved.

The technique disclosed in Patent Literature 3 can achieve uniform resolution or brightness in reaction to the positional deviation of a medium, unlike the technique of Patent Literature 2. However, the technique disclosed in Patent Literature 3 requires a more reduction in the size of an area for a part functioning as a lens than with the technique of Patent Literature 2. This reduction leads to a dark image due to a reduction in the amount of light for image formation or the need for using needlessly bright lighting, and thus a faster reading system is unlikely to be achieved. Further, using lenses with basic characteristics thereof changed is required to use the techniques disclosed in Patent Literatures 2 and 3, and thus these techniques have difficulty in response to various operation distances (distance from a lens end to a reading medium) for various uses including inspection.

Contrary to Patent Literatures 1, 2 and 3, the image reading devices according to Embodiments 1 and 2 enable an easy increase in the depth of field, that is, improvement in the depth of the field, without need for a change in basic characteristics of lenses.

Embodiment 3

Embodiment 3 is described with reference to FIGS. 14 to 26. The side wall plates 6 that are the spacers 6 and the specific-light blocking members 8 that are described for explanation of the image reading devices according to Embodiments 1 and 2 can also be used in an image reading device according to Embodiment 3, although not illustrated in these drawings. Since the image reading device according to Embodiment 3 and the image reading devices according to Embodiments 1 and 2 are similar in basic configuration as an image reading device other than the sidewall plates 6 that are the spacers 6 and the specific-light blocking members 8, explanation of basic configuration of the image reading device according to Embodiment 3 is omitted.

Figure 14A:
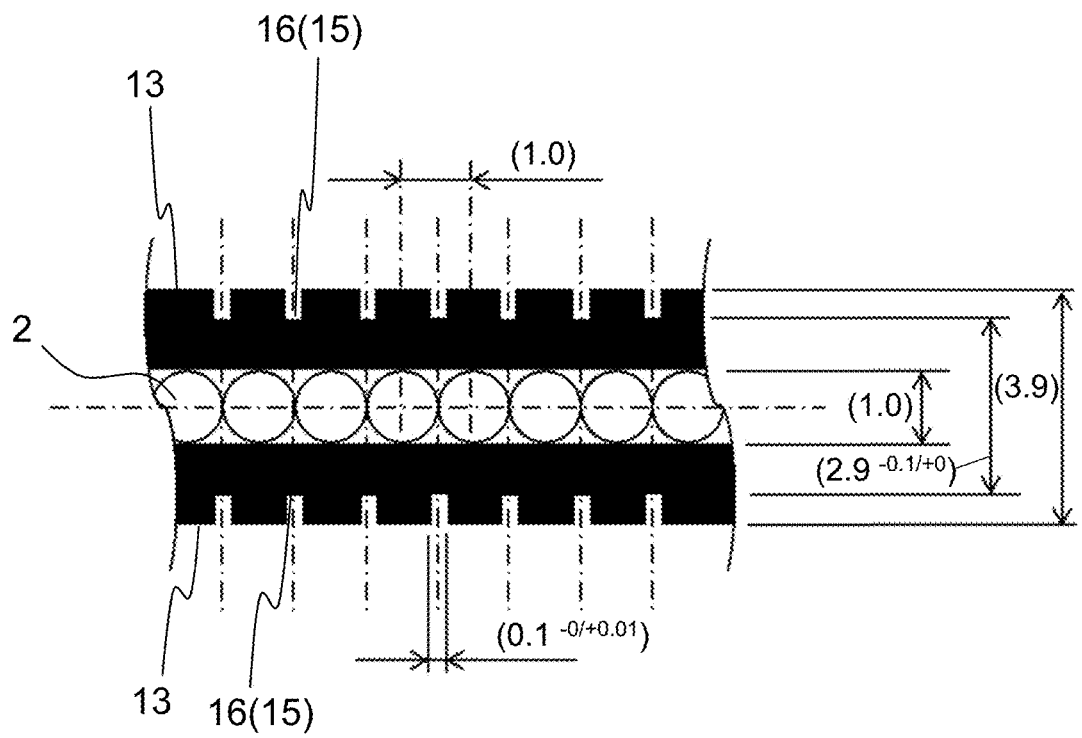
FIGS. 14A and 14B illustrate configuration of a lens array of an image reading device according to Embodiment 3.
Figure 14B:
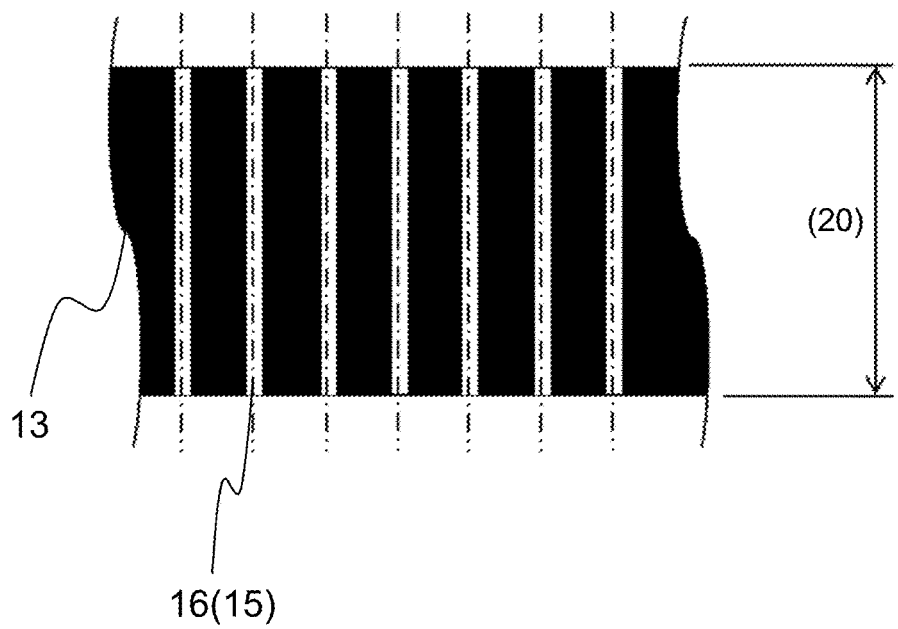
Figure 15:
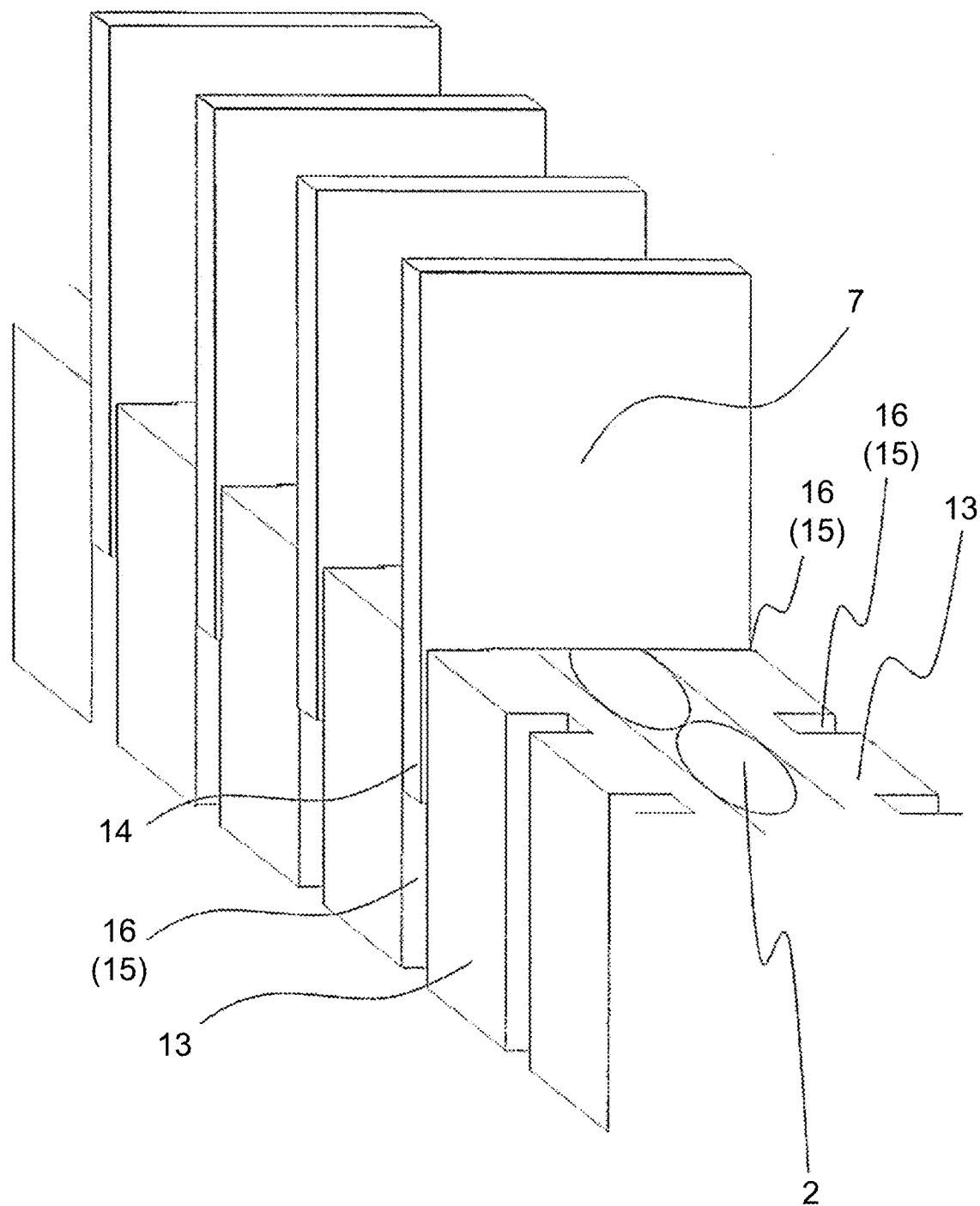
FIG. 15 illustrates configuration of the lens array and an overlap preventer of the image reading device according to Embodiment 3.
Figure 17A:
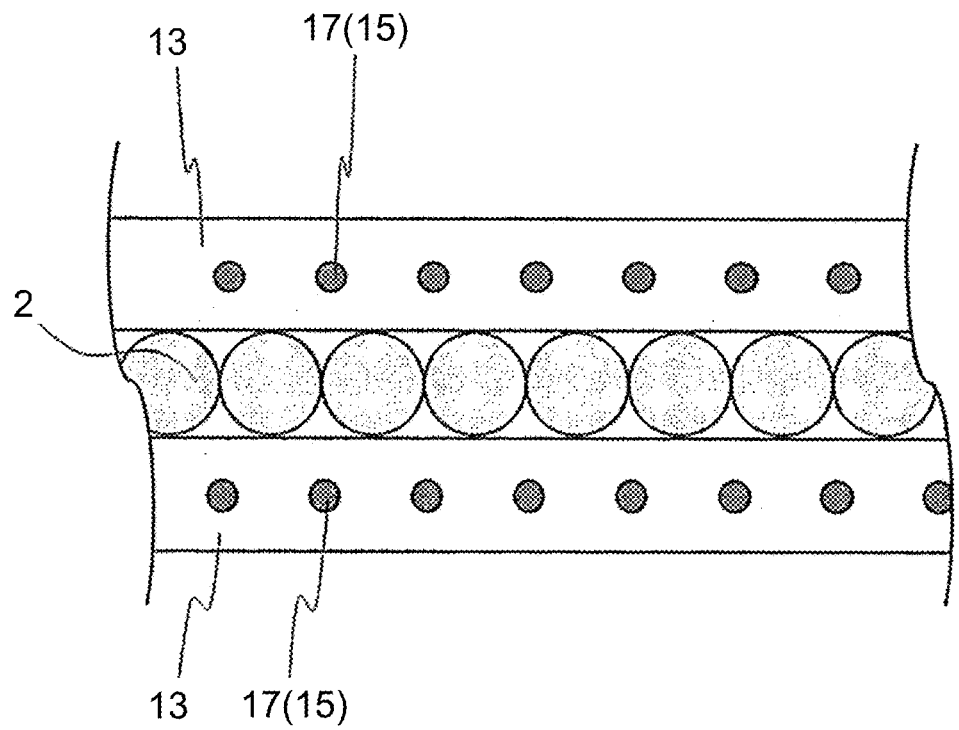
FIGS. 17A and 17B illustrate configuration of the lens array of the image reading device according to Embodiment 3.
Figure 17B:
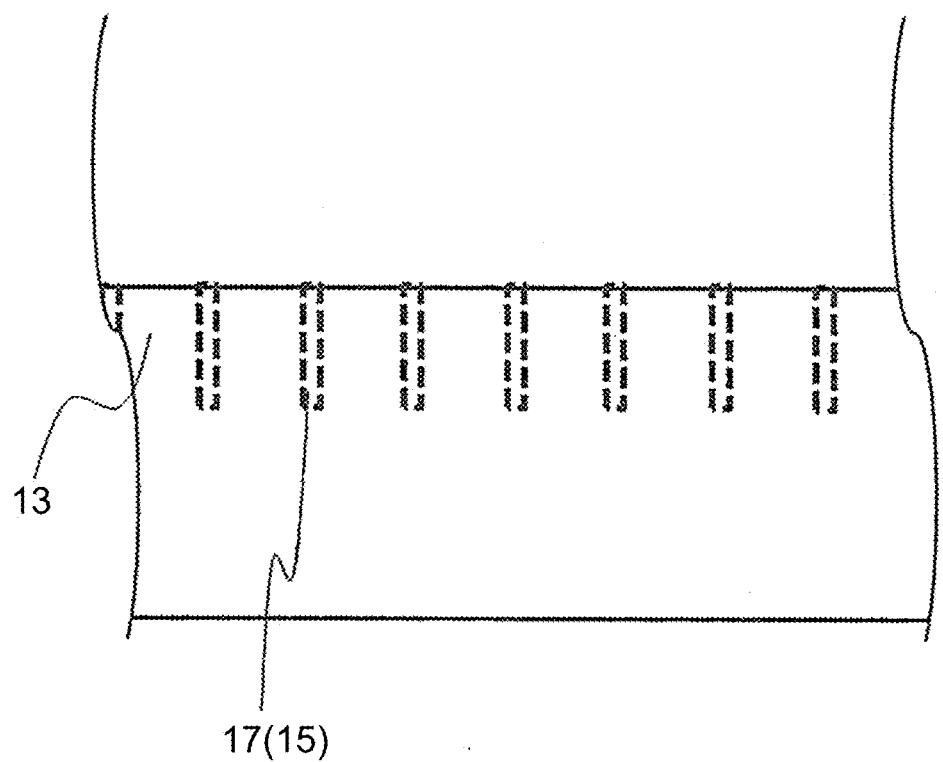
Figure 18:
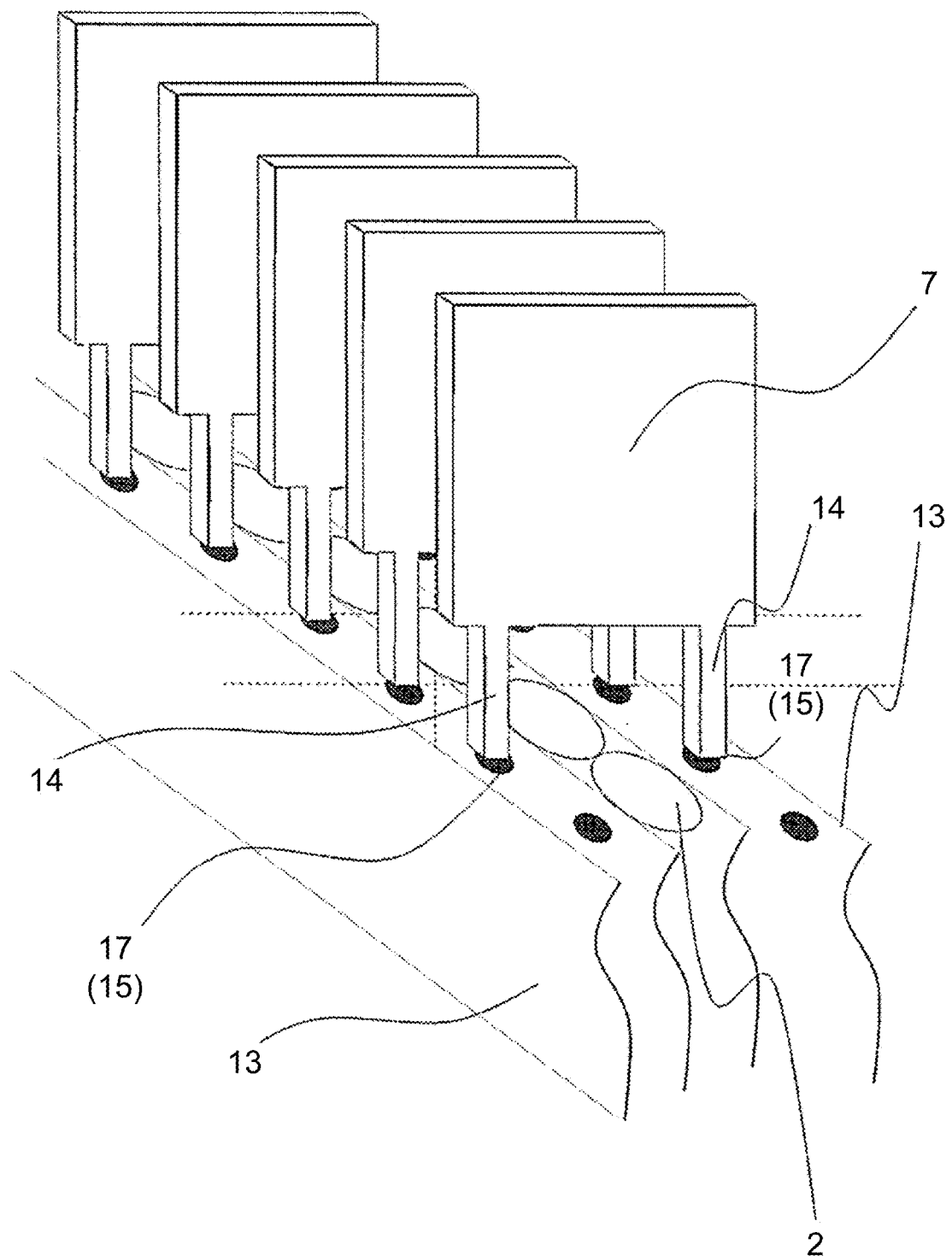
FIG. 18 illustrates configuration of the lens array and the overlap preventer of the image reading device according to Embodiment 3.
Figure 19A:
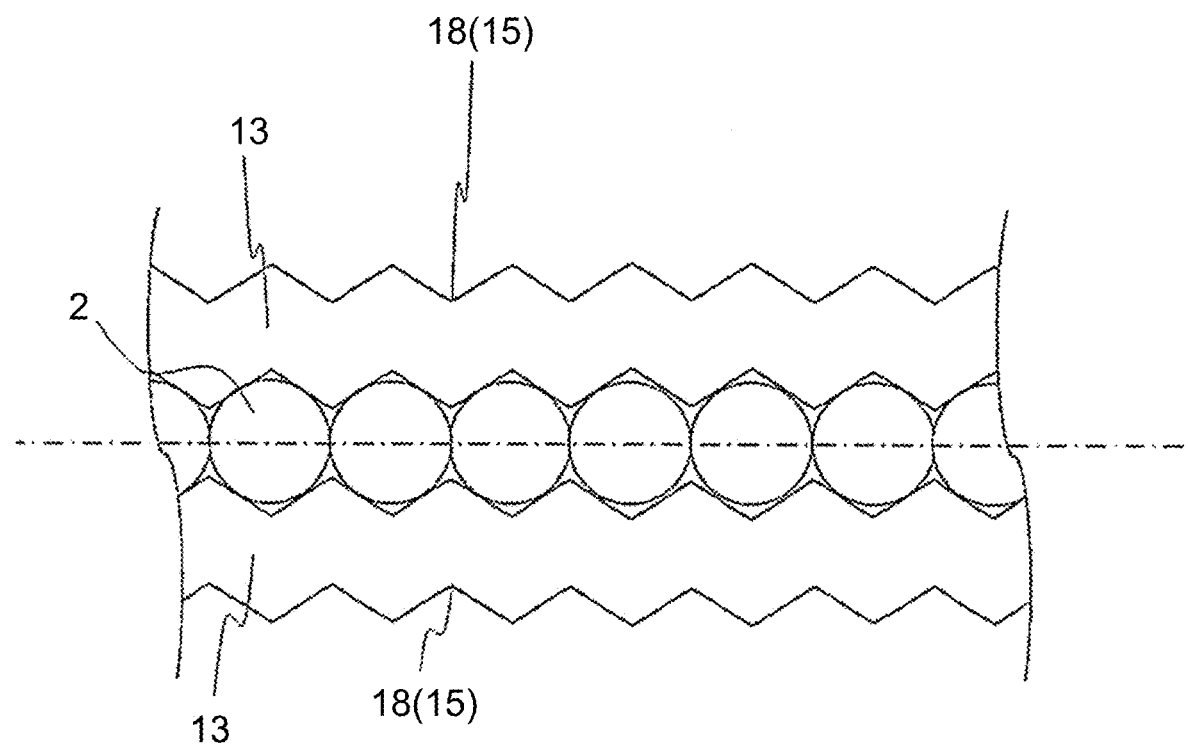
FIGS. 19A and 19B illustrate configuration of the lens array of the image reading device according to Embodiment 3.
Figure 19B:
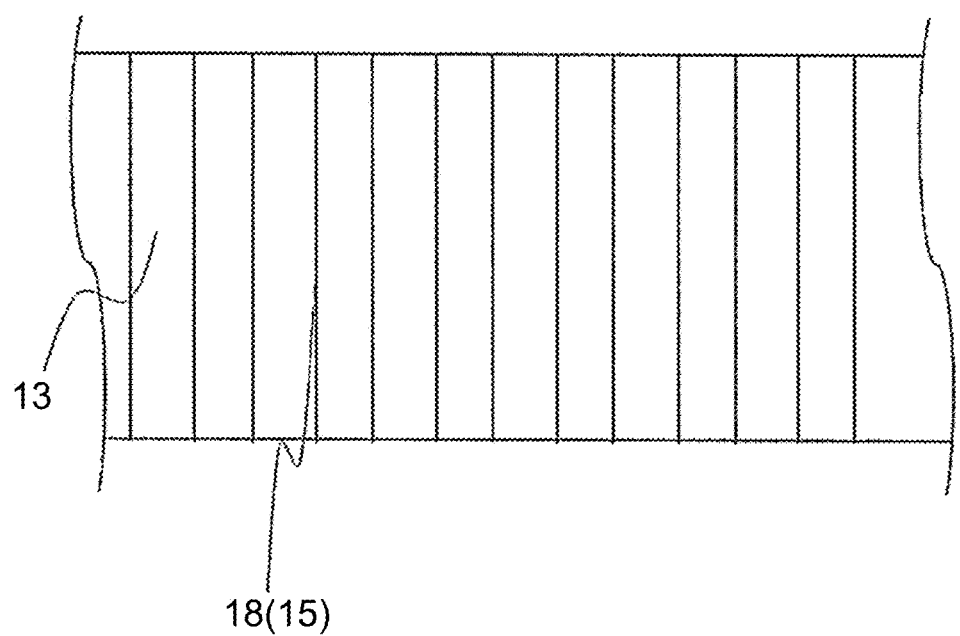
Figure 20:
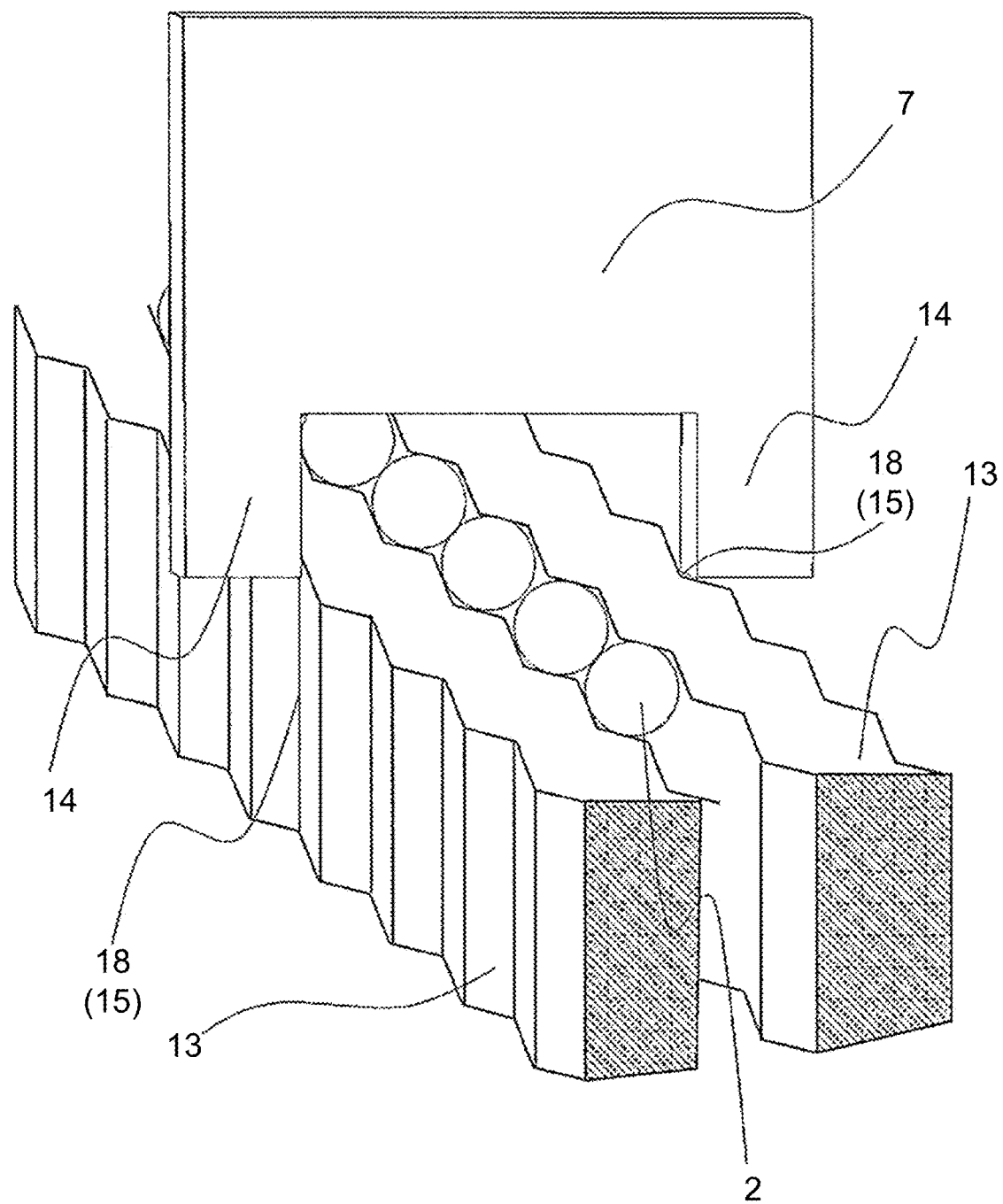
FIG. 20 illustrates configuration of the lens array and the overlap preventer of the image reading device according to Embodiment 3.

The image reading device according to Embodiment 3 has the structure illustrated in FIGS. 14, 15 and 16, the structure illustrated in FIGS. 17 and 18, or the structure illustrated in FIGS. 19 and 20 that each have, in fixing plates 13 that are side plates included in the lens array 1, an alignment structure, for disposal between the lenses 2 light blocking walls that are the slit plates 7, so as to have a one-to-one correspondence to the lenses 2. These structures provide limitation to the optical path with high-accuracy positional configuration to prevent light that is specific light incident at a low incident angle from directly entering the sensor elements 4, thereby enabling increasing the depth of field, that is, improving the depth of field, while suppressing a decrease in an amount of light.

The fixing plates 13 in FIGS. 14 to 20 are two components that extend in the main scanning direction and sandwich the lenses 2 therebetween to arrange the lenses 2 in an array so as to form the lens array 1. As described in Embodiment 1, encapsulation resin that is fixing resin is filled between the lenses 2 and the fixing plates 13. The slit section 5 that is the overlap preventer includes multiple slit plates 7 arranged in the main scanning direction and extending in the sub-scanning direction to partition off a space, and the slit plates 7 are fixed to the fixing plates 13. As the multiple slit plates 7, elements are illustrated that extend in the sub-scanning direction to partition off a space and are arranged in the main scanning direction to form an array of multiple space arranged along the main scanning direction and having one-to-one correspondence to the lenses 2. The slit section 5 includes fixing legs 14 extending toward the lens array 1, and the fixing legs 14 contact the fixing plates 13. The fixing plates 13 include fitting portions 15 for fitting with the fixing legs 14.

The fitting portions 15 are multiple grooves 16 formed along the optical axis of the lens array 1 of which optical axis direction matches a cylindrical direction or the focal depth direction that is the direction of the depth of field as illustrated in FIGS. 14, 15 and 16. Alternatively, the fitting portions 15 are multiple holes 17. Each of the multiple holes 17 is inserted by each of the fixing legs 14 along the optical axis of the lens array 1 as illustrated in FIGS. 17 and 18. Further, each of grooves 18 as illustrated in FIGS. 19 and 20 that are portions that have a distance in the sub-scanning direction shorter than those of the other portions of two fixing plates 13 extending along the main scanning direction in a zigzag-shape so as to be axisymmetric with respect to the main scanning direction may serve as the fixing portion 15. In this case, as illustrated, the lenses 2 are fixed to each of the two fixing plates 13 so as to be located at positions corresponding to intermediate positions between the grooves 18. The fitting portions 15 are multiple structural elements formed along the main scanning direction. The material of the fixing plates 13 illustrated in FIGS. 19 and 20 is described later.

Figure 16A:
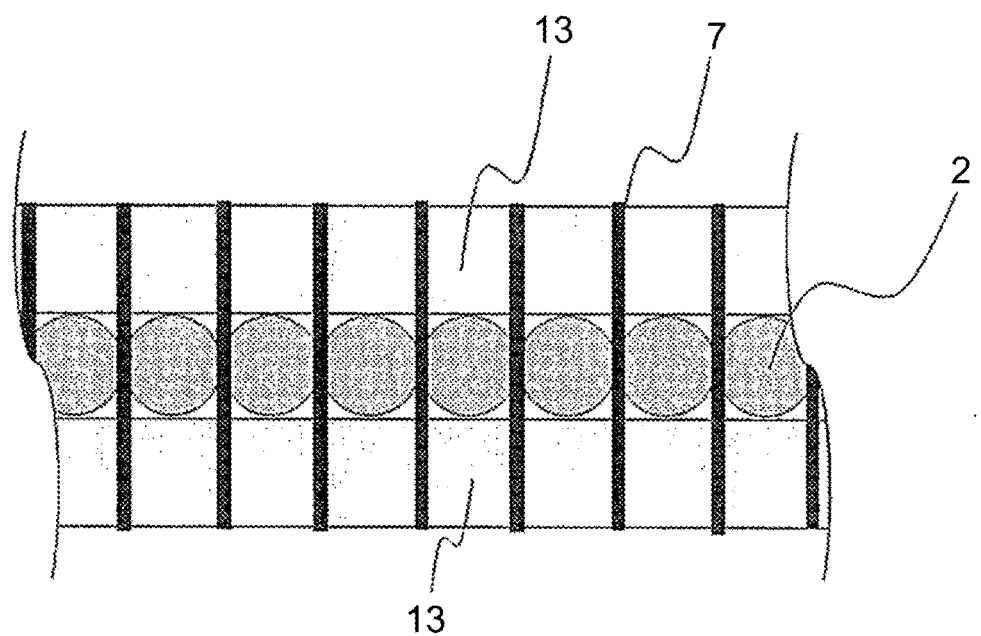
FIGS. 16A and 16B illustrate configuration of the lens array and the overlap preventer of the image reading device according to Embodiment 3.
Figure 16B:
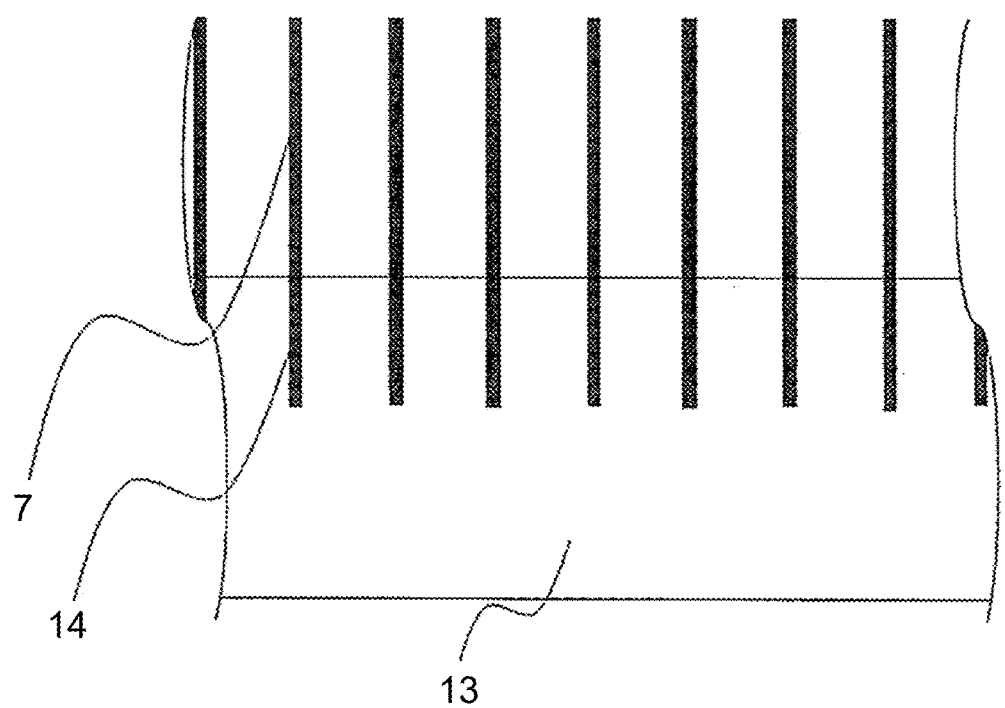

FIG. 14A illustrates the lens array 1 when viewed in the optical axis direction. FIG. 14B illustrates the lens array 1 when viewed in the sub-scanning direction. FIGS. 14A and 14B illustrates the lens array 1 prior to attachment of the slit plates 7. The unit of the dimensions is millimeters. FIG. 15 illustrates the lens array 1 with the multiple slit plates 7 fixed thereto. FIG. 16A illustrates the lens array 1 and the slit plates 7 when viewed in the optical axis direction. FIG. 16B illustrates the lens array 1 and the slit plates 7 when viewed in the sub-scanning direction.

The structure illustrated in FIGS. 14, 15 and 16 has, in the fixing plates 13 that are side plates for sandwiching and holding the lens array 1, as an alignment structure for the lens array 1, grooves 16 that each have a center on an extension of a line serving as a tangent line for each of two adjacent lenses 2 and are parallel to the cylindrical direction that is the optical axis direction of the lenses 2, and the fixing legs 14 are fitted to the grooves 16 to achieve alignment and upright erection of the slit section 5, that is, alignment and upright erection of the slit plates 7.

FIG. 17A illustrates the lens array 1 when viewed in the optical axis direction. FIG. 17B illustrates the lens array 1 when viewed in the sub-scanning direction. In FIG. 17B, the holes 17 that are the fitting portions 15 are illustrated with dotted lines to indicate that a see-through view is used. FIGS. 17A and 17B illustrates the lens array 1 prior to attachment of the slit plates 7. FIG. 18 illustrates a state in which the fixing legs 14 are about to be inserted, that is, fitted, to the holes 17 that are the fitting portions 15 to fix the multiple slit plates 7 to the lens array 1 illustrated in FIG. 17.

The structure illustrated in FIGS. 17A, 17B and 18 has, in the fixing plates 13 that are side plates for sandwiching and holding the lens array 1, as an alignment structure for the lens array 1, the holes 17 that each have a center on an extension of a line serving as a tangent line for each of two adjacent lenses 2 and have a depth in the cylindrical direction that is the optical axis direction of the lenses 2, and the fixing legs 14 are fitted to the holes 17 to achieve alignment and upright erection of the slit section 5, that is, alignment and upright erection of the slit plates 7. In this structure, the fixing legs 14 are shaped so as to be insertable into the holes 17.

FIG. 19A illustrates the lens array 1 when viewed in the optical axis direction. FIG. 19B illustrates the lens array 1 when viewed in the sub-scanning direction. FIG. 19A, 19B illustrates the lens array 1 prior to attachment of the slit plates 7. FIG. 20 illustrates a state in which the fixing legs 14 are about to be inserted, that is, fitted, into the grooves 18 that are the fitting portions 15 to fix the multiple slit plates 7 to the lens array 1 illustrated in FIG. 19.

The structure illustrated in FIGS. 19A, 19B and 20 has, in the fixing plates 13 that are side plates for sandwiching and holding the lens array 1, as an alignment structure for the lens array 1, the grooves 18 that each have a center on an extension of a line serving as a tangent line for each of two adjacent lenses 2 and are parallel to the cylindrical direction that is the optical axis direction of the lenses 2. The grooves 18 are portions that have a distance in the sub-scanning direction shorter than those of the other portions of two fixing plates 13 extending along the main scanning direction in a zigzag-shape so as to be axisymmetric with respect to the main scanning direction. The fixing legs 14 are fitted to the grooves 18 to achieve alignment and upright erection of the slit section 5, that is, alignment and upright erection of the slit plates 7.

Although cases in which the fixing legs 14 are formed in the slit plates 7 are described above, the fixing legs 14 may be formed in the sidewall plates 6 that are the spacers 6 described in Embodiments 1 and 2. In the case in which the fixing legs 14 are formed in the sidewall plates 6, the slit plates 7 are fixed to the fixing plates 13 via the sidewall plates 6. Further, configuration may be employed in which the fixing legs 14 are formed in both the slit plates 7 and the sidewall plates 6. That is, the fixing legs 14 are formed in at least one of the slit plates 7 or the sidewall plates 6. Moreover, the fixing legs 14 are included in the slit section 5 and thus may have black surfaces. In this case, at least surfaces of the fixing legs 14 that are contiguous with the slit plates are black surfaces. The black surfaces are, for example, black velvety surfaces.

Since the image reading device according to Embodiment 3 has the structure illustrated in FIGS. 14, 15 and 16, the structure illustrated in FIGS. 17 and 18, or the structure illustrated in FIGS. 19 and 20, the slit plates 7 of the slit section 5 can be disposed with a high positional accuracy by fixing to the fixing plates 13 the fixing legs 14 formed in the slit section 5, more specifically, in at least one of the slit plates 7 or the sidewall plates 6.

Figure 21:
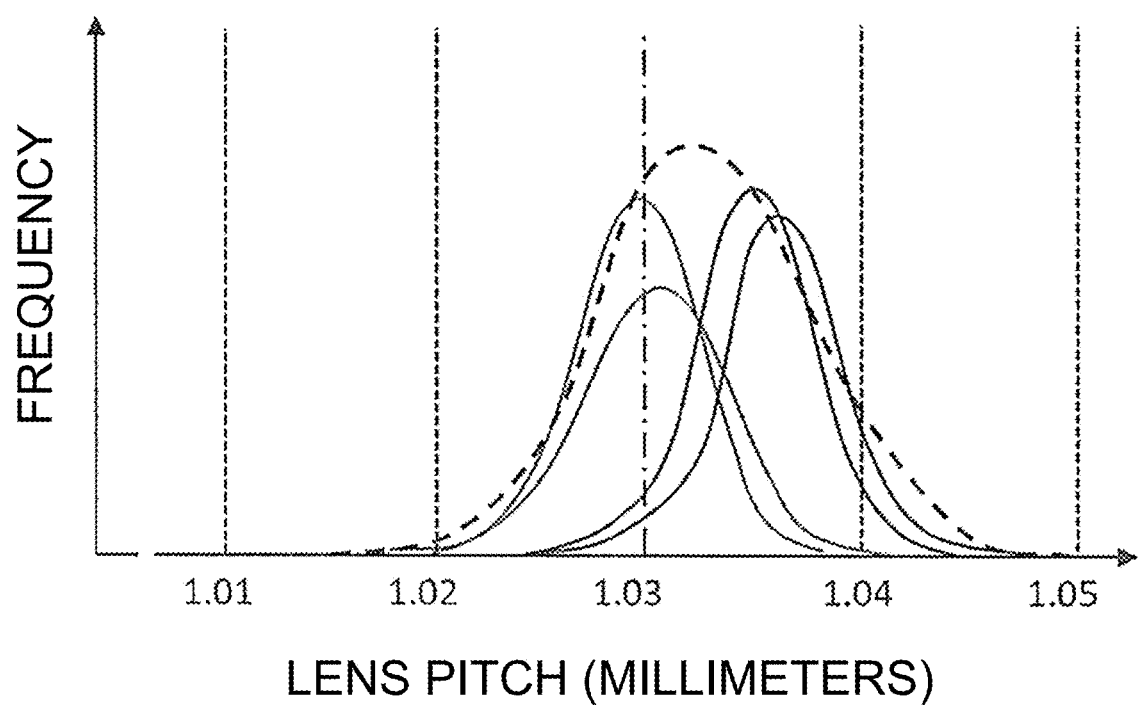
FIG. 21 illustrates positional deviations in the image reading device.
Figure 22:
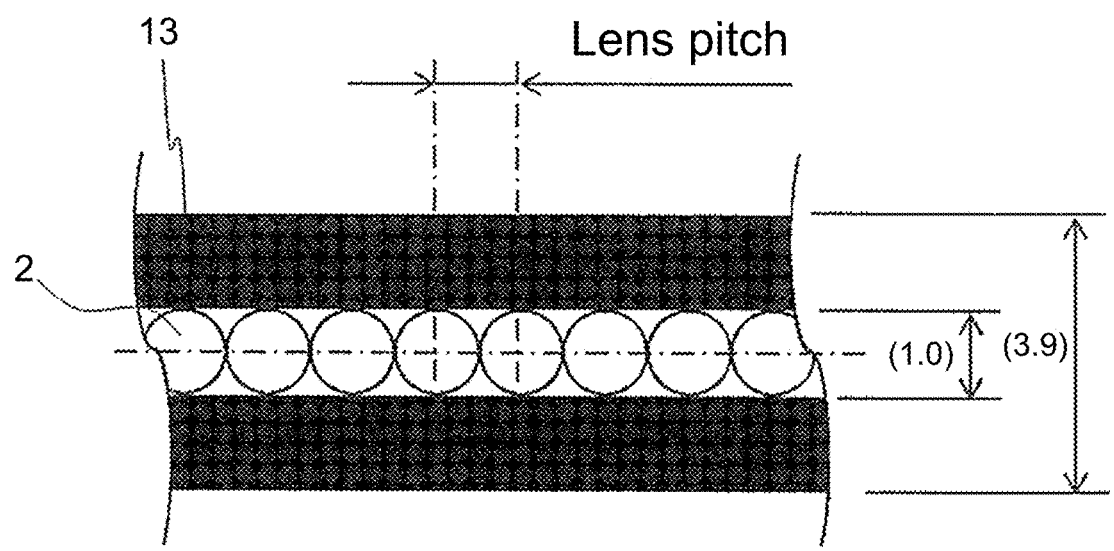
FIG. 22 illustrates positional deviations in the image reading device.
Figure 23:
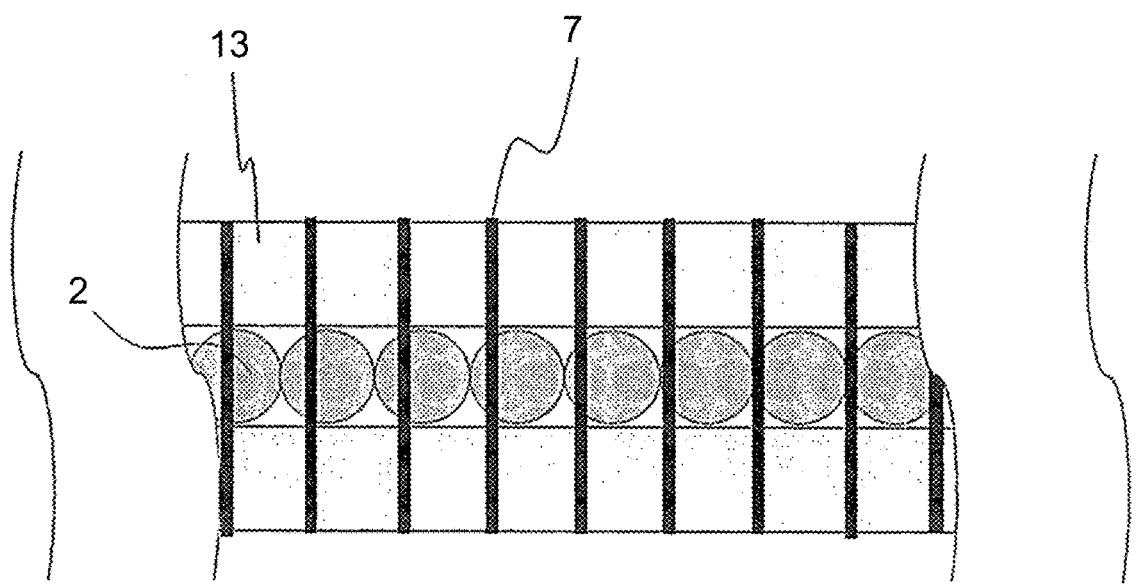
FIG. 23 illustrates positional deviations in the image reading device.

FIGS. 21, 22 and 23 illustrate positional deviations in the image reading device. In FIG. 21, the horizontal axis indicates the pitch of the lenses 2 and the vertical axis indicates a frequency. FIG. 22 illustrates the lens array 1 when viewed in the optical axis direction. The unit of the dimensions is millimeters. FIG. 23 illustrates the lens array 1 and the slit plates 7 when viewed in the optical axis direction. As illustrated in FIGS. 21 and 22, individual average values between the lenses 2 of each lens array 1 as variations in pitches of the lenses 2 are distributed within about 5 m, and the pitches of the lenses 2 in a single lens array 1 are distributed within about 10 m. In the case of a group of the slit plates 7 disposed at a single pitch, accumulation of pitch deviations produces portions at which correct separation of optical paths for the individual lenses 2 is not provided as illustrated in FIG. 23, resulting in failure to obtain uniform images across the whole length of the sensor element array 3.

To avoid such failure to obtain uniform images across the whole length of the sensor element array 3, in processing of the lens array 1 with respect to the side plates that are the fixing plates 13, a number and dimension of the lenses 2 for a total reading length are measured and an average pitch is calculated, to eliminate the effect of lens pitch variations of the lenses 2 between multiple lens arrays 1. Then, after determining a starting point, a group of the fitting portions 15, that is, the groves 16, the holes 17, or the grooves 18, are formed at regular intervals with the average pitch of the lens array 2. The group of the fitting portions 15 formed in the aforementioned manner enables prevention of the center positions of the slit plates 7 from being located with deviation relative to the lenses 2 at or greater than the degrees of variations in arrangement of the lenses 2.

Preventing occurrence of variations in arrangement of the lenses 2 enables forming the fitting portions 15, that is, the groves 16, the holes 17 or the grooves 18, with, even at a maximum, a deviation of ±0.03 mm from an ideal arrangement for a thickness of 0.1 mm, that is, an arrangement in which each slit plate 7 overlaps each of adjacent lenses by 0.05 mm. In the case in which a higher accuracy is required, alignment of the fitting portions 15 may be performed when forming the fitting portions 15, that is, the groves 16, the holes 17 or the grooves 18, while checking positions of the lenses 2 using an imaging device such as a camera.

The slit plates 7 of the image reading device according to Embodiment 3 are formed by (i) to ensure strength while achieving a thin thickness to increase the aperture ratio of the lenses 2, performing fitting of stainless plates with a thickness of 0.1 mm so as to have a width of 4.0 mm, a height of 10 mm in the optical axis direction corresponding to the height of the slit plates 7, with portions with a length of 5 mm corresponding to the fitting portions 15 and (ii) performing blackening and low-reflectivity processing to both sides thereof so as to be the aforementioned black surfaces. Specifically, since a stainless material is used, surfaces of the stainless plates are processed by sandblasting to form textured surfaces, and then black plating processing is performed for low light reflectivity. The slit plates 7 are fixed to the lens array 1 by (i) fitting the slit plates 7, more specifically, the fixing legs 14, to the fitting portions 15 that are holes or grooves in side surfaces of the lens array 1 and (ii) applying an adhesive to insertion portions, that is, the fitting portions.

Due to the aforementioned configuration, an occupation area of the slit plates 7 in the image reading device according to Embodiment 3 can be smaller, that is, dimensions of the slit plates 7 in the width direction can be smaller, and thus assembly without a major change in a conventional sensor module mechanism is achievable. Further, since the slit plates 7 stand independently without the sidewall plates 6 that are the spacers 6 as structural components at portions connecting the slit plates 7 therebetween, that is, holding the slit plates 7 along the main scanning direction of the lens array 2, near-surface reflection effect of emitted light can be easily eliminated.

Figure 24:
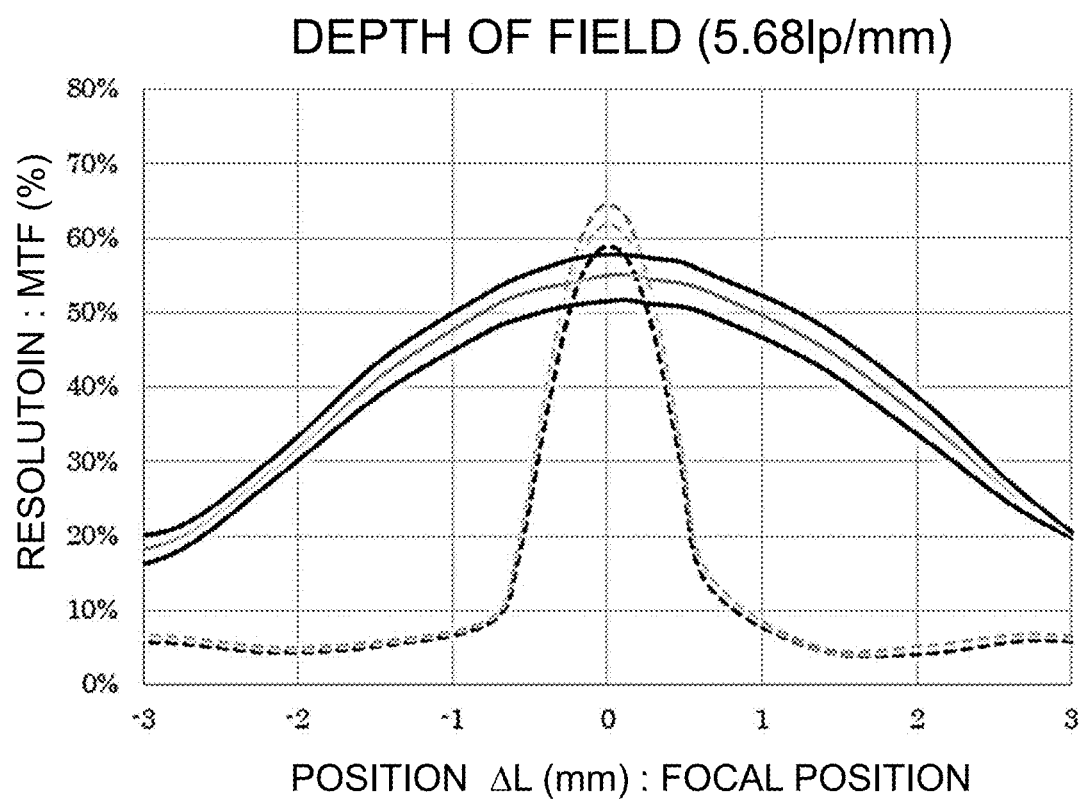
FIG. 24 is a graph indicating data relating to depth-of-field characteristics of the image reading device according to Embodiment 3.

FIG. 24 is a graph indicating data relating to depth-of-field characteristics of the image reading device according to Embodiment 3. The vertical axis indicates the focal position and the horizontal axis indicates a resolution, that is, an MTF. The broken lines indicate data of the lens array 1 without the slit plates 7, and the solid lines indicate data of the lens array 1 with the slit plates 7, that is, data of the image reading device according to Embodiment 3. Three samples are plotted for each array. In detail, the three solid lines in FIG. 24 indicate depth-of-field characteristics obtained by the configuration of the image reading device according to Embodiment 3. In contrast to slight decreases in the peak resolution from the depth-of-field characteristics of conventional lenses 2 that are indicated by the three broken lines in FIG. 24, great improvement is achieved in reaction to positional deviation of the reading target in the reading optical axis direction, resulting in increase in the depth of field by about three times.

Although the slit plates 7 described above have a width of 4.0 mm that is almost the same as the width of the lens array 1, similar effects are obtainable by the slit plates 7 having any width that provides light-blocking portions having the same width as the diameter of the lenses 2, and thus the width can be modified to match the mounting mechanism. Although a stainless plate may be used as abase material of the slit plates 7 to ensure strength, resin that has high workability and is easy to process into a shape for attachment may be used as the material of the slit plates 7, with processing of surfaces thereof so as to have a low-reflectivity. Further, although the slit plates 7 described above have a thickness of 0.1 mm in view of availability as a material, reducing the thickness while ensuring shape stability as the slit plates 7 leads to a narrower area providing limitation to light emitted from the lens array 1 and thus enables reducing a decrease in brightness as an optical system.

In the case as illustrated in FIGS. 17A, 17B and 18 in which the fitting portions 15 of the image reading device according to Embodiment 3 are the holes 17, a row of the holes 17 having a predetermined diameter is formed in each surface of the side plates of the lens array 1 at positions corresponding to the tangent lines of adjacent lenses 2. The group of the slit plates 7 having a one-to-one positional relationship relative to the lenses 2 is formed by fitting, to the rows of the holes 17, the slit plates 7 processed to have the black surfaces and a low-reflectivity. Since the lenses 2 of the lens array 1 are arranged to be perpendicular to lens surfaces, the rows of the holes 17 may be formed, in the side plates that are the fixing plates 13 of the lens array 1, along a direction perpendicular to the lens surfaces.

In the present embodiment, to arrange the lenses 2 and the slit plates 7 at predetermined positions so as to have a one-to-one correspondence, the slit plates 7 are fixed to the rows of the holes 17 that (i) have a diameter of 0.2 mm and a depth of 5 mm that correspond to 0.2 mm that is the thickness of the slit plates and (ii) are formed in surfaces of the side plates on the lens-light emission side with alignment so as to be arranged at positions between adjacent lenses 2. The holes 17 for fixing the silt plates 7 may have any diameter that allows the side plates of the lens array 1 that are the fixing plates 13 to have a thickness sufficient for maintaining strength. For example, a diameter $\Phi$ of 0.2 mm can be used for about 1.9 mm thickness of the side plates that are the fixing plates 13. The permissible increase is to approximately a half or less of the thickness of the side plates of the lens array 1.

As described above, the fitting portions 15 of the image reading device according to Embodiment 3 are formed through processing to the fixing plates 13 that are side plates of the lens array 1 so as to have a structure that enables alignment and arrangement of the slit section 5, that is, alignment and arrangement of the group of the slit plates 7. According to this structure, a mechanism for improvement in depth of field can be arranged without an increase in area occupied by a lens system in a cross section and without a major change to mechanical portions of a conventional image reading device.

With regard to the configuration of the lens array 1 in which the lenses 2 are arranged in an array along the main scanning direction and the lenses 2 are sandwiched between the two fixing plates 13 extending along the main scanning direction, the fixing plates 13 need not be included in the lens array 1 and instead may be formed outside the lens array 1. Note that this structure can also be described by saying "the lenses 2 are sandwiched by the two fixing plates 13". That is, the lens array 1 may be formed integrally with, or be formed separately from, the fixing plates 13, that is, may be formed as a separate component.

In the case in which the lens array 1 and the fixing plates 13 are formed integrally, processing to the lens array 1 is required to form the fitting portions 15. This requires an increase in amount of time for processing and an increase in processing accuracy, and thus may possibly lead to a relatively high manufacturing cost. Thus, configuration for alignment and attachment of the slit section 5, that is, alignment and attachment of the group of the slit plates 7, as a structure for forming the lens array 1 and the fixing plates 13 separately, is described below with reference to FIGS. 25A, 25B and 26. The fixing plates 13 in FIGS. 25 A, 25B and 26 are rubber plates 13 formed separately from the lens array 1. The grooves 16 are formed, in the rubber plates 13 that are the fixing plates 13, along the optical axis of the lens array 1 of which optical axis direction matches the cylindrical direction or the focal depth direction that is the direction of the depth of field. An adhesive layer 19 is a layer of adhesive such as double-faced adhesive tape.

Figure 25A:
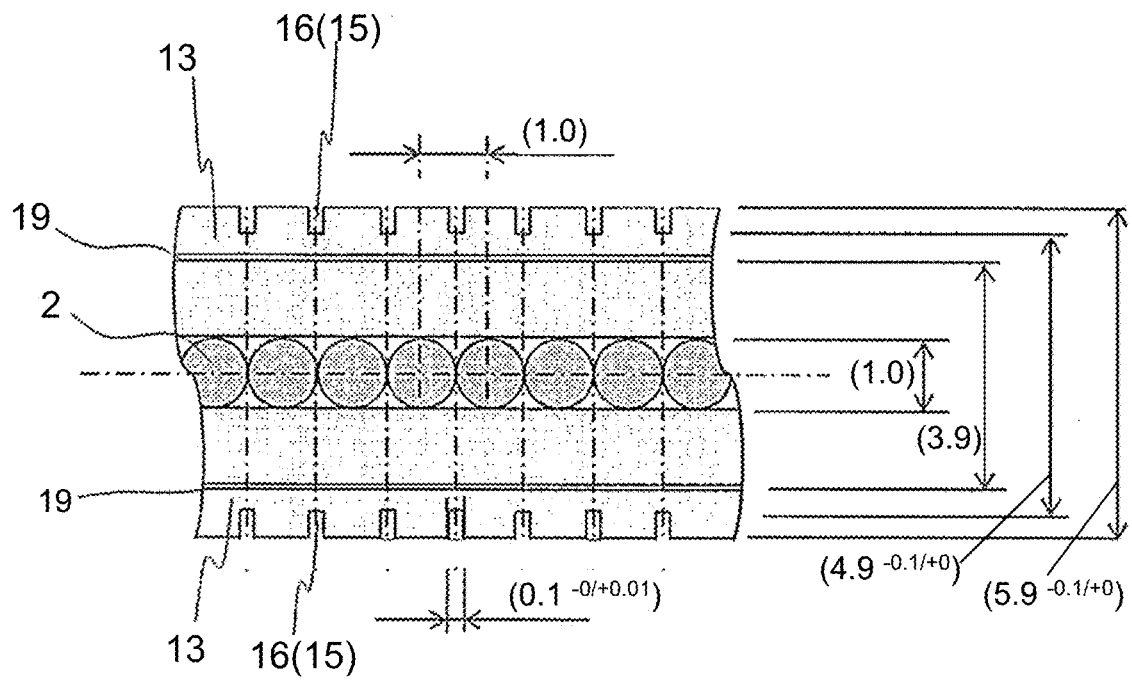
FIGS. 25A and 25B illustrate configuration of the lens array of the image reading device according to Embodiment 3.
Figure 25B:
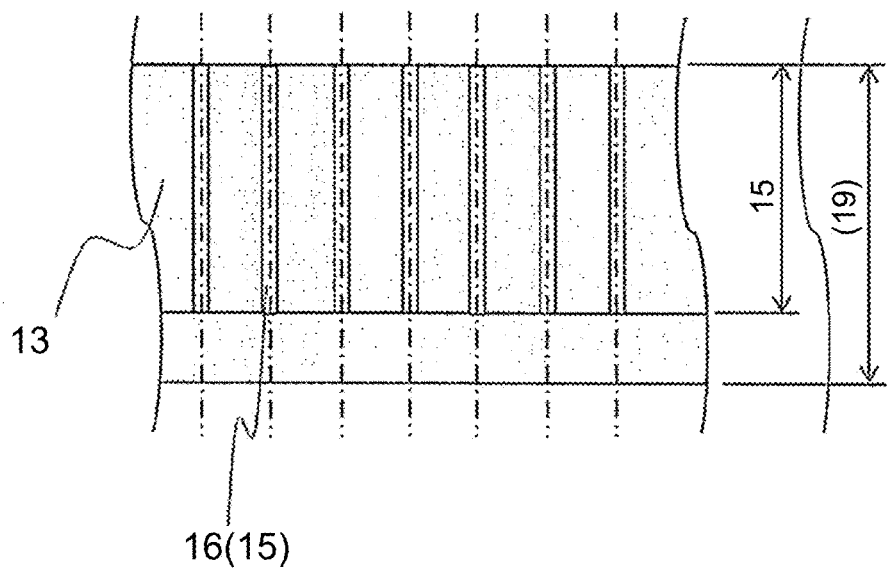
Figure 26:
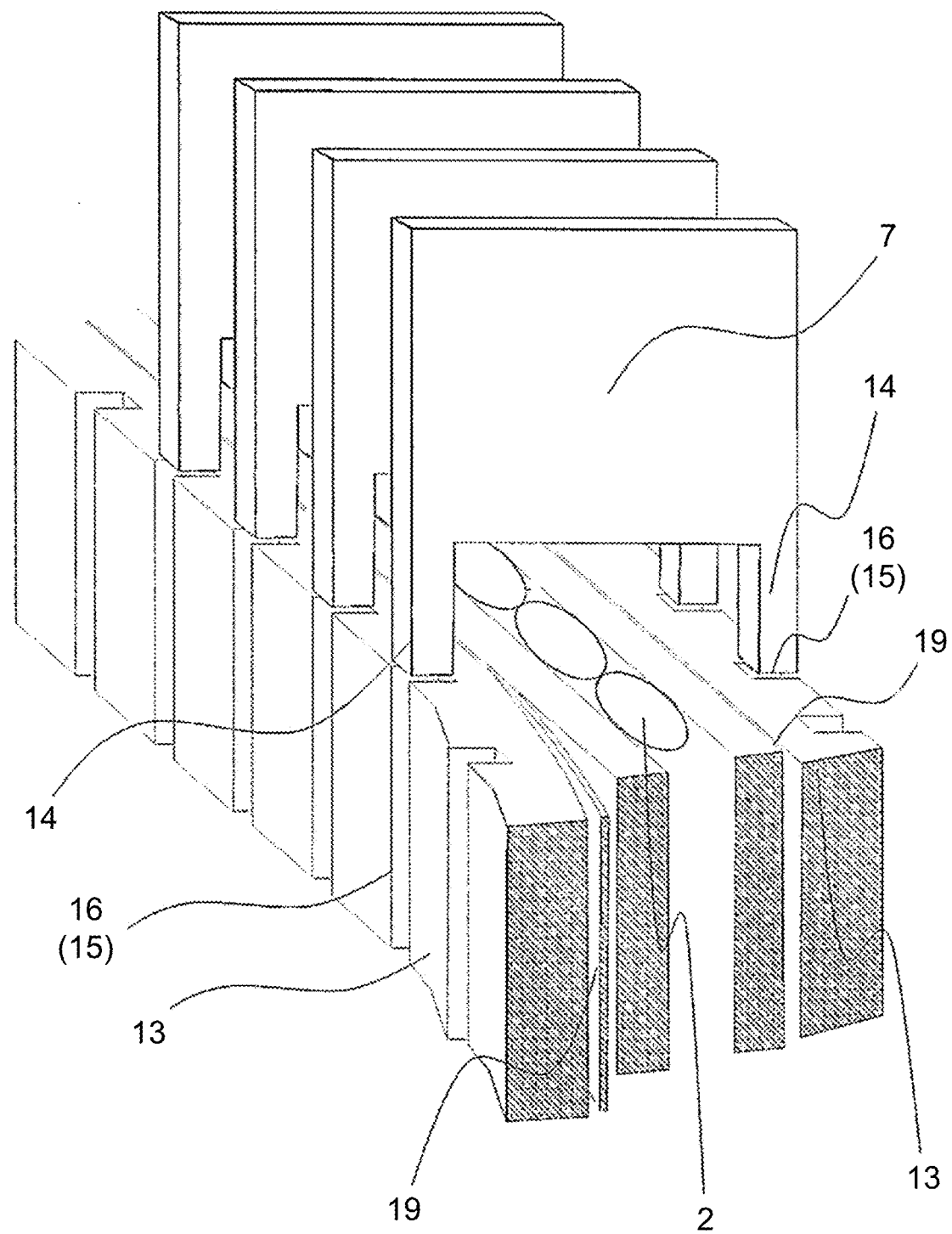
FIG. 26 illustrates configuration of the lens array and the overlap preventer of the image reading device according to Embodiment 3.

FIG. 25A illustrates the lens array 1 when viewed in the optical axis direction. FIG. 25B illustrates the lens array 1 when viewed in the sub-scanning direction. FIGS. 25A and 25B illustrate the lens array 1 prior to attachment of the slit plates 7. The unit of the dimensions is millimeters. FIG. 26 illustrates a state in which the fixing legs 14 are about to be inserted, that is, fitted, to the grooves 16 that are the fitting portions 15 to fix the multiple slit plates 7 to the lens array 1 illustrated in FIGS. 25 A and 25B. For easy understanding of positional relationships, FIG. 26 illustrates the fixing plate 13 that is the rubber plate 13, the adhesive layer 19 and the side plate of the lenses 2 on one side in an imagined state in which end portions thereof are separated to one another, that is, a state in which the fixing plate 13 that is the rubber plate 13 and the side plate of the lenses 2 are not yet bonded to each other using the adhesive layer 19.

The fitting portions 15 that are illustrated in FIGS. 25 A and 25B and 26 and are included in the image reading device according to Embodiment 3 are formed in the fixing plates 13 that are the rubber plates 13 formed separately from the lens array 1. An assembling process is described below. First, separately from the lens array 1, by molding, thin rubber plates 13 are formed that have the grooves 16 of a required number (i) that have the same width as the slit plates 7 and (ii) that are arranged in parallel at a pitch of a statistical minimum of an arrangement pitch of the lenses 2. Then, bonding is performed using the adhesive layer 19 such that the grooves 16 of the rubber plate 13 are located at positions between adjacent lenses 2, and similar processing is performed for the opposite surface of the lens array 1.

Due to the pitch of the grooves 16 of the rubber plate 13 that is smaller than the pitch of the lenses 2, at one end of the lens array 1, the lens array 1 and the rubber plate 13 are fixed to each other with the groove 16 aligned. Then, for positional adjustment of the lenses 2 and the grooves 16 across the whole length of the lens array 1, the lens array 1 and the rubber plate 13 are bonded with the rubber plate 13 extended such that positions of the grooves 16 match the positions of the lenses. By performing this operation on the opposite surface, processing for arrangement and fixation of the slit plates 7 at predetermined positions between the lenses 2 is achieved. On condition that a thickness of the rubber plates 13 is appropriately selected, the rubber plates 13 may have the holes 17 illustrated in FIGS. 17A, 16B and 18 instead of the grooves 16, or each of the grooves 18 that are portions that have a distance in the sub-scanning direction shorter than those of the other portions of two rubber plates 13 extending along the main scanning direction in a zigzag-shape so as to have bilateral symmetry with respect to the main scanning direction may serve as the fitting portion 15.

Alignment and retention of the slit plates 7 are achievable by inserting into the fitting portions 15 formed in the rubber plates 13 the slit section 5, that is, the slit plates 7 or the sidewall plates 6. Since the rubber plates 13 processed to have grooves are obtainable by rubber molding processing, positional alignment of the lenses 2 and the fitting portions 15 is ensured by post-molding extensibility that is a change in length of about 5% of the whole length, and manufacture as a separate component creates cost benefits.

Although configuration suitable for attaching the slit section 5, that is, the slit plates 7, to the lens array 1 in post-processing is described above, the configuration of the image reading device according to Embodiment 3 is not limited to this configuration. Another alignment of the slit section 5, that is, slit plates 7, is described below. The lens array 1 is manufactured by arranging on a flat plate made of fiber reinforced plastic (FRP) the lenses 2 in parallel and in close contact and by sandwiching by bonding and fixing two FRP plates. In the case of forming the fixing plates 13 integrally with the lens array 1, the FRP plates correspond to the fixing plates 13. Checking a position of each lens 2 in post-processing is difficult since (i) variations in a lens system and bending, inclination or the like of rods occur during arrangement and (ii) both ends of the lens array are the only references for arrangement of the lenses.

Thus, a structure for arrangement of the lenses 2 may be formed in the side plates in advance for arrangement thereto of the lenses 2, and additionally, a structure indicating in the lens array 1 positions between adjacent lenses 2 may be used by using FRP plates that have, on surfaces thereof opposite to the surfaces for arrangement of the lenses 2, a structure indicating positions between pairs of lenses. Configuration suitable for achievement of the aforementioned structures is illustrated in FIGS. 19A, 19B and 20 in which the grooves 18 that are portions that have a distance in the sub-scanning direction shorter than those of the other portions of the two fixing plates 13 as the FRP plates extending along the main scanning direction in a zigzag-shape so as to have bilateral symmetry with respect to the main scanning direction are the fitting portion 15, and each of the lenses 2 is fixed between two grooves 18.

Specifically, (i) a structure of a row of protrusions that each have a triangular cross-sectional shape to hold the lens 2 by contacting a side surface thereof is formed on a side of the FRP plate to which the lenses 2 are to be fixed, that is, on a side of the side plate for holding lenses, at a pitch corresponding to a fiber diameter of the lenses 2 and (ii) structures that each indicate an arrangement position of the lens 2, for example, structures that each have a concave triangular shape, are formed on the opposite surface of the FRP plate at positions deviating by a half of the pitch from the row of the protrusions to hold lenses. The lens array 1 is formed using two side plates formed in the aforementioned manner. According to this configuration, positions of the lenses 2 with respect to the side plates are determined independently of diameter or skew in placement of the lenses as illustrated in FIGS. 19A and 19B, and thus, as illustrated in FIG. 20, determination of positions of the light blocking walls that are the slit plates 7 and installation can be performed that is only with reference to the shape of the outer side surfaces of the lens array 1.

In the case of forming the fixing plates 13 illustrated in FIGS. 19A, 19B and 20 with FRP plates, the fixing plates 13 may be formed collectively with molding of the FRP plates or may be formed by post-molding to or bonding of another component to the FRP plates as base materials. The aforementioned structure of the fixing plates 13 enables (i) improvement in positional accuracy of the lenses and (ii) installing and fixing light blocking plates to concave portions of the side plates, and thus both improvement in optical characteristics and improvement in work efficiency can be achieved.

As described above, in the lens array 1 of the image reading device according to Embodiment 3, each of the side plates that are the fixing plates 13 for holding the lenses 2 has a structure for alignment of the lenses 2 and has, on the opposite surface, an alignment structure corresponding to the structure for alignment of the lenses 2. Further, in the lens array 1 having a structure in which the lenses 2 arranged in a row are fixed by the two side plates that are the fixing plates 13, each of the side plates that are the fixing plates 13 (i) has, on a surface thereof to which the lenses are fixed, fixing structures for fixing positions of the lenses that have a height less than one-third of the diameter of the lenses and that are arranged at the pitch of the lenses so as to contact side surfaces of the lenses 2 and (ii) has, on the outer side surface thereof, a structure for fixing the slit plates 7 at positions between adjacent lenses 2, and the lenses 2 are bonded by these side plates.

Furthermore, the image reading device according to Embodiment 3 includes (i) an array of the lenses 2 as the lens array 1 that are sandwiched and bonded by thin plates that have, on one surfaces thereof, structures for alignment and retention of the slit plates 7 that are the light blocking members and (ii) the group of the slit plates 7 arranged at the predetermined positions corresponding to the group of the lenses 2. The thin plates that are the fixing plates 13 having the structures for alignment and retention of the slit plates 7 that are the light blocking members may be made of a material having high extensibility. The portions for alignment and retention of the slit plate 7 may be arranged at a pitch lower than or equal to a minimum lens pitch of the lenses 2.

Furthermore, to ensure positional accuracy of the lenses and structures for installation of the light blocking members across the entire length, the lens array 1 of the image reading device according to Embodiment 3 may be formed by, after aligning the lenses 2 and the fitting portions 15 that are the structures for installation of the slit plates 7, fixing to one end or a center portion of the lens array 1 the thin plates that are the rubber plates 13 having extensibility and having a group of structures that are the group of the fitting portions 15 for holding the slit plates 7, and then sticking other portions of the thin plates in order while extending the thin plates.

As described above, according to the image reading devices according to Embodiments 1 to 3, since high-accuracy positional alignment of the slit section 5, that is, high-accuracy positional alignment of the slits 7, can be easily achieved by fitting, that is, inserting, the fixing legs 14 into the fitting portions 15 formed in the fixing plates 13, an image reading device with stably increased depth of field and stable quality of an image is obtainable.

Furthermore, according to the image reading devices according to Embodiments 1 to 3, the slit section 5 or the fixing plates 13 provide limitation for the optical path to prevent light that is specific light incident at a low incident angle from directly entering the sensor elements 4. Due to this configuration, an image reading device with a stably increased depth of field and stable quality of an image is obtainable without need for a change in basic characteristics of lenses.

REFERENCE SIGNS LIST

1 Lens array (Rod lens array)
2 Lens (Rod lens)
3 Sensor element array
4 Sensor element (Sensor IC)
5 Slit section (Overlap preventer)
6 Sidewall plate (Spacer)
7 Slit plate
8 Specific-light blocking member (Beam-like member)
9 Reading target (Illumination target, Object)
10 Light source
11 Sensor substrate
12 Housing
13 Fixing plate (Rubber plate)
14 Fixing leg
15 Fitting portion
16 Groove
17 Hole
18 Groove
19 Adhesive layer

The invention claimed is:

1. An image reading device comprising:
a lens array including lenses that are sandwiched between two fixing plates extending along a main scanning direction and are arranged in an array along the main scanning direction;
a sensor element array including sensor elements to receive light converged by the lenses and being arranged in an array along the main scanning direction; and
an overlap preventer to prevent overlap of images formed by the lenses and being disposed between the lens array and the sensor element array, wherein
the overlap preventer is a slit section including a plurality of slit plates arranged in the main scanning direction and extending in a sub-scanning direction intersecting the main scanning direction to partition off a space,
the slit section includes fixing legs extending toward the lens array, and
the fixing legs are in contact with the fixing plates so that the slit section is fixed to the fixing plates.

2. The image reading device according to claim 1, wherein the slit plates are arranged in the main scanning direction and extend in the sub-scanning direction to partition off the space such that a plurality of the spaces are defined in an array along the main scanning direction so as to have a one-to-one correspondence to the lenses.

3. The image reading device according to claim 1, wherein the fixing plates include fitting portions for fitting with the fixing legs.

4. The image reading device according to claim 3, wherein the fitting portions are a plurality of grooves formed along an optical axis of the lens array or are a plurality of holes, each of the plurality of holes being inserted by each of the fixing legs along the optical axis of the lens array.

5. The image reading device according to claim 3, wherein
the two fixing plates extend along the main scanning direction in a zigzag-shape so as to have bilateral symmetry with respect to the main scanning direction, and
the fitting portions are grooves formed in the fixing plates, each of the grooves being a portion having a distance in the sub-scanning direction shorter than distances of the other portions of the fixing plates.

6. The image reading device according to claim 5, wherein the lenses are fixed to each of the two fixing plates so as to be located at positions corresponding to intermediate positions between the grooves.

7. The image reading device according to claim 1, wherein the fixing plates are rubber plates formed separately from the lens array.

8. The image reading device according to claim 1, wherein the slit section includes, on each of the slit plates, a specific-light blocking member protruding in the main scanning direction to block specific light incident at an angle smaller than or equal to an angular aperture of the lenses from entering the sensor elements.

9. The image reading device according to claim 8, wherein:
the slit section further includes two sidewall plates that extend in the main scanning direction and face each other in the sub-scanning direction, and
the specific-light blocking member is a beam-like member that extends between the sidewall plates or that is disposed partially between the sidewall plates.

10. The image reading device according to claim 9, wherein the fixing legs are formed in at least one of the slit plates or the sidewall plates.

11. The image reading device according to claim 9, wherein the slit plates extend in the sub-scanning direction between the two sidewall plates to partition off a space between the two sidewall plates.

12. The image reading device according to claim 9, wherein the sidewall plates have black surfaces on at least surfaces contiguous with the slit plates.

13. The image reading device according to claim 8, wherein the specific-light blocking member has a portion nearer the lenses protruding further than a portion nearer the sensor elements.

14. The image reading device according to claim 8, wherein a plurality of the specific-light blocking members are disposed on each of the slit plates along the optical axis of the lens array.

15. The image reading device according to claim 14, wherein an interval e between adjacent slit plates of the plurality of slit plates is smaller than or equal to a value obtained by multiplying an overlap degree m by 0.6 and a lens diameter $\Phi$ that is a diameter of the lenses.

16. The image reading device according to claim 15, wherein a length of the slit section on an optical path is greater than or equal to a value obtained by dividing the interval e by a tangent $\theta$ where the angular aperture is $\theta$.

17. The image reading device according to claim 8, wherein the slit plates and the specific-light blocking member have black surfaces.

18. The image reading device according to claim 17, wherein the black surfaces are black and velvety surfaces.

19. An image reading device comprising:
a lens array including lenses that are sandwiched between two fixing plates extending along a main scanning direction and are arranged in an array along the main scanning direction;
a sensor element array including sensor elements to receive light converged by the lenses and being arranged in an array along the main scanning direction; and
an overlap preventer to prevent overlap of images formed by the lenses and being disposed between the lens array and the sensor element array, wherein
the overlap preventer is a slit section including two sidewall plates extending in the main scanning direction and facing each other in a sub-scanning direction intersecting the main scanning direction, and a plurality of slit plates arranged in the main scanning direction and extending in the sub-scanning direction to partition off a space,
the slit plates are fixed to the fixing plates, and
the slit section includes, on each of the slit plates, a specific-light blocking member protruding in the main scanning direction to block specific light incident at an angle smaller than or equal to an angular aperture of the lenses from entering the sensor elements and being a beam-like member that extends between the sidewall plates or that is disposed partially between the sidewall plates.

20. An image reading device comprising:
a lens array including lenses that are sandwiched between two fixing plates extending along a main scanning direction and are arranged in an array along the main scanning direction;
a sensor element array including sensor elements to receive light converged by the lenses and being arranged in an array along the main scanning direction; and
an overlap preventer to prevent overlap of images formed by the lenses and being disposed between the lens array and the sensor element array, wherein
the overlap preventer is a slit section including a plurality of slit plates arranged in the main scanning direction and extending in a sub-scanning direction intersecting the main scanning direction to partition off a space,
the slit plates are fixed to the fixing plates, and
the slit section includes, on each of the slit plates, a specific-light blocking member that protrudes in the main scanning direction to block specific light incident at an angle smaller than or equal to an angular aperture of the lenses from entering the sensor elements and that has a portion nearer the lenses protruding further than a portion nearer the sensor elements.

* * * * *